(12) United States Patent
Roth

(10) Patent No.: US 10,339,503 B1
(45) Date of Patent: Jul. 2, 2019

(54) VARIABLE ACCESS TO TIME BLOCK INFORMATION

(71) Applicant: Amazon Technologies, Inc., Reno, NV (US)

(72) Inventor: Gregory Branchek Roth, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 953 days.

(21) Appl. No.: 13/655,338

(22) Filed: Oct. 18, 2012

(51) Int. Cl.
*G06Q 10/10* (2012.01)

(52) U.S. Cl.
CPC .................. *G06Q 10/1095* (2013.01)

(58) Field of Classification Search
CPC ........ G06Q 10/00; G06Q 40/00; G06F 17/00; G06F 17/60
USPC ........................................................ 705/7.19
See application file for complete search history.

(56) References Cited

U.S. PATENT DOCUMENTS

| | | | |
|---|---|---|---|
| 5,124,912 A | 6/1992 | Hotaling et al. | |
| 5,899,979 A | 5/1999 | Miller et al. | |
| 6,732,080 B1 | 5/2004 | Blants | |
| 7,188,073 B1 | 3/2007 | Tam et al. | |
| 7,283,970 B2 | 10/2007 | Cragun et al. | |
| 7,747,458 B2 | 6/2010 | Lyle et al. | |
| 7,904,321 B2 | 3/2011 | Moore et al. | |
| 7,925,528 B2 | 4/2011 | Biazetti et al. | |
| 8,364,501 B2 | 1/2013 | Rana et al. | |
| 8,407,076 B2 | 3/2013 | Nastacio | |
| 8,712,820 B2 | 4/2014 | Gingras et al. | |
| 8,903,055 B2 * | 12/2014 | Brauninger et al. | 379/88.22 |
| 2006/0047557 A1 | 3/2006 | Bieselin et al. | |
| 2008/0243582 A1 | 10/2008 | Chen et al. | |
| 2009/0089133 A1 | 4/2009 | Johnson et al. | |
| 2009/0094088 A1 | 4/2009 | Chen et al. | |
| 2010/0185465 A1 | 7/2010 | Rana et al. | |
| 2011/0071878 A1 | 3/2011 | Gingras et al. | |
| 2011/0320237 A1 | 12/2011 | Beaman et al. | |
| 2012/0005728 A1 | 1/2012 | Farrell et al. | |
| 2012/0066015 A1 * | 3/2012 | Loeffen | 705/5 |
| 2012/0095979 A1 * | 4/2012 | Aftab et al. | 707/706 |
| 2012/0179499 A1 * | 7/2012 | Loeffen | 705/5 |
| 2012/0238248 A1 * | 9/2012 | Jonsson | G06Q 10/1095 455/413 |
| 2014/0278671 A1 * | 9/2014 | Leonhardt et al. | 705/7.19 |

OTHER PUBLICATIONS

Wainer et al., "Scheduling Meetings Through Multi-Agent Negotiations," *Decision Support Systems*, No. 44, pp. 285-297 (Apr. 2007).
U.S. Appl. No. 13/655,346, titled "Variable Access to Time Block Information", filed Oct. 18, 2012.
U.S. Appl. No. 13/655,355, titled "Time Proposals Using Variable Access to Time Block Information", filed Oct. 18, 2012.

* cited by examiner

*Primary Examiner* — Romain Jeanty
(74) *Attorney, Agent, or Firm* — Kilpatrick Townsend & Stockton LLP

(57) ABSTRACT

Access to calendar data indicating the state of time blocks is varied according to visibility conditions associated with at least some of the time blocks. Parameters for a meeting are used to determine a state in which to indicate a block of time, which may conflict with the meeting. The state may be either an occupied or unoccupied state.

12 Claims, 13 Drawing Sheets

VARIABLE ACCESS TO TIME BLOCK INFORMATION

CROSS-REFERENCE TO RELATED APPLICATIONS

This application incorporates by reference for all purposes the full disclosure of co-pending U.S. patent application Ser. No. 13/655,346, filed Oct. 18, 2012 concurrently herewith, entitled "VARIABLE ACCESS TO TIME BLOCK INFORMATION", and co-pending U.S. patent application Ser. No. 13/655,355, filed Oct. 18, 2012 concurrently herewith, entitled "TIME PROPOSALS USING VARIABLE ACCESS TO TIME BLOCK INFORMATION".

BACKGROUND

Personal information management systems have enhanced personal communication. Many personal information management systems provide multiple capabilities and manage information for large groups of people. Some personal information management systems, for example, manage electronic mail, personal tasks, calendar appointments, journal entries, notes, and/or other information. Such systems often provide enhanced capabilities for certain sets of users, such as users having accounts with the systems. For example, some systems allow users in a certain set, which may be defined by a directory, to see the states of each other's calendars. Such viewing can be useful, for example, for figuring out the best time to schedule meetings. Typical personal information management systems, however, have limited functionality and their existing capabilities often introduce additional issues. For example, if one person sees an unoccupied block of time on another person's calendar, that person may try to schedule a meeting in that unoccupied block regardless of the other person's opinion of the time block's appropriateness for the meeting. Once a meeting has been proposed, however, it can be difficult for an invitee to decline the proposal knowing that the organizer has seen the free space on his or her calendar.

BRIEF DESCRIPTION OF THE DRAWINGS

Various embodiments in accordance with the present disclosure will be described with reference to the drawings, in which.

DETAILED DESCRIPTION

Figure 1:
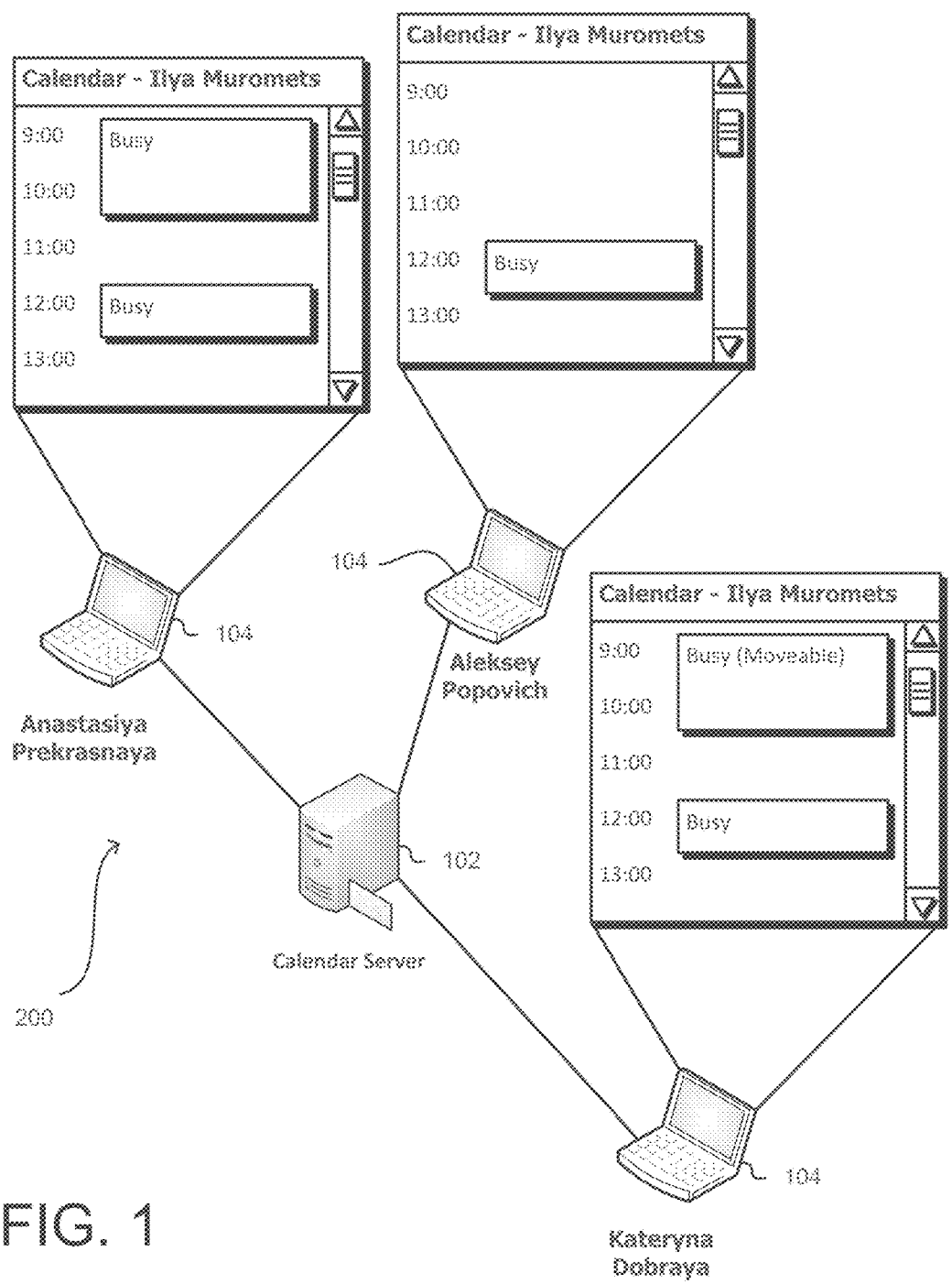
FIG. 1 shows an illustrative example of an environment which may be used to implement a calendar management system, in accordance with at least one embodiment.

In the following description, various embodiments will be described. For purposes of explanation, specific configurations and details are set forth in order to provide a thorough understanding of the embodiments. However, it will also be apparent to one skilled in the an that the embodiments may be practiced without the specific details. Furthermore, well-known features may be omitted or simplified in order not to obscure the embodiment being described. Techniques, including systems and methods described herein, relate to providing different access to calendar information in different circumstances. For example, for a particular calendar having various appointments scheduled thereon, different views of the calendar may be provided at different times.

In some embodiments, a calendar management system that manages calendar data on behalf of various accounts. Some or even all of the accounts may correspond to various users. For example, employees of an organization may each have a corresponding account with the calendar management system. Some accounts may, however, correspond to multiple users and some accounts may not correspond to any particular user, but may be set up for particular purposes, such as administration of a department. It should be noted that, for the purpose of illustration, calendar management systems are described. However, a calendar management system may be a component of a larger personal information management system which may manage electronic mail, electronic tasks, and other information on behalf of multiple accounts. Thus, while various examples of accounts are described as being accounts of a calendar management system, the accounts may be accounts of the calendar management system by virtue of being accounts of a larger calendar management system.

A calendar management system, as noted, may manage various calendar data on behalf of its accounts. The calendar data, in various embodiments, comprises a plurality of appointments, each appointment having various associated parameters. The parameters of an appointment may, for instance, include a start time for the appointment, an end time for the appointment, a recurrence setting for the appointment, a subject for the appointment, a location for the appointment, and/or other parameters. The calendar data may also comprise a plurality of meetings. A meeting, in an embodiment, is an appointment having one or more attendees (sometimes referred to as one or more invitees) other than the organizer of the appointment. Thus, in an embodiment, a meeting is an appointment having particular properties. Further the terms "appointment" and "meeting," unless otherwise clear from context, may be used to denote electronic records corresponding to particular blocks of time.

In various embodiments, appointments can have associated visibility conditions, which may be part of the parameters for appointment discussed above. Visibility conditions for an appointment may be conditions that are used to determine how or even whether information about the appointment is provided to requestors for such information. In other words, visibility conditions may be conditions for determining bow a state of a block of time is to be indicated to a requestor for the state. As an illustrative example, visibility conditions for a time block may be determinative whether a requestor for information about the time block (or another time block that includes some or all of the time block) receives data indicating the time block is occupied or unoccupied. While various embodiments of the present disclosure discuss the states of a time block being occupied or unoccupied, other states of a time block are also considered as being within the scope of the present disclosure. For example, in some embodiments, three states are possible: unoccupied, occupied-undetailed and occupied-detailed. With the occupied-undetailed state, information about the block of time may simply indicate the block of time as occupied (e.g., "busy"). With the occupied-detailed state, details about how the block of time is occupied may be provided. Such details may include, for example, a subject for an appointment during the block of time, a location for the appointment, attendee(s) for the appointment, and/or other details about the block of time.

Visibility conditions fora block of time maybe specified by various users of a calendar management system, although some or all visibility conditions may be set as defaults. In an embodiment, visibility conditions are specified by a user through a graphical user interface that allows the user to specify the conditions for the block of time. The graphical user interface may be, for instance, an interface for scheduling appointments. Thus a user may schedule an appointment as he/she would typically schedule an appointment, but add one or more visibility conditions during the process. Once specified, the visibility conditions for an appointment may be provided to the calendar management system which may enforce the conditions when providing information about a calendar for the account for which the visibility conditions were set.

As an illustrative example, while typically eager and willing to spend his or her time innovating to advance the interests of his or her employer, an engineer may prefer to start such innovation at a reasonable time. At the same time, a department administrator striving to help the employer remain a market leader, may frequently attempt to arrange meetings for the engineer to discuss his or her innovations at times that the engineer deems unreasonable. The engineer can address this problem in various ways. For example, the engineer can simply decline electronic meeting requests originating from an account of the administrator when those electronic meeting requests are scheduled in blocks of time that the engineer considers unreasonable. This solution, however, causes numerous unnecessary actions including creating unnecessary meeting proposals and unnecessary actions to consider and/or decline meeting proposals, both the engine and other invitees to the meetings. As another example, the engineer could use conventional systems to schedule a "dummy" appointment for times of the day the engineer does not want to meet to discuss his or her innovations. Such an appointment may create a record of an occupied time block in a calendar management system, although the engineer may not have any particular plans for that block of time. Further, such a dummy appointment may be set to recur every work day, so the engineer only has to schedule the dummy appointment once. With the dummy appointment in place, a calendar management system of the employer may indicate to the administrator that, for the engineer, the time block is occupied. The Administrator may then refrain from proposing meetings that intersect with the block of time occupied by the dummy appointment.

Using dummy appointments in conventional calendar management systems, however, may have several disadvantages. For instance, the engineer may want to avoid certain meetings during the recurring block of time, but may be amenable to other types of meetings, such as meetings with superiors in the employer's organization. With conventional dummy appointments, all users, including the superiors of the engineer, of a calendar management system typically will receive calendar data indicating that, for the engineer, the block of time is occupied. This may be undesirable because it unnecessarily limits the times in which the superiors can schedule meetings with the engineer while avoiding conflicting meeting times, in accordance with various embodiments of the present disclosure, however, the engineer is able to use a calendar management system to overcome some or all of these disadvantages by specifying blocks of time and conditions for varying who sees the blocks of time as occupied or unoccupied.

Visibility conditions may be defined in various ways in accordance with various embodiments. For example, visibility conditions may be identity conditions, such as conditions based at least in part on an account in connection with which a request for calendar data has been made. In the above example with an engineer and administrator whose opinions differ as to the suitability of certain times of day, the engineer may identify the administrator explicitly as someone who sees a certain block of time every day as occupied, whereas other users may see the block of time as unoccupied. Visibility conditions may also be based at least in part on accounts designated as attendees to a proposed meeting, which may or may not include the organizer of the meeting. For instance, a user may specify that a block of time is shown as unoccupied only if a request to view the block of time is made in connection with a meeting proposal that includes certain attendees, who may be defined explicitly by identifying the attendees or by attributes of the attendees, such as job level, job title, and/or the like. Visibility conditions may also be defined, in various embodiments, based at least in part on other factors that are not necessarily based at least in part on attendees and/or organizers of meetings. For example, visibility may be defined on attributes of a proposed meeting. Such attributes may be explicitly defined, such as meeting importance. Some attributes may be calculated. For instance, visibility conditions may be defined based at least in part on a measurement of how difficult a meeting is to schedule in a block of time that is collectively unoccupied by all designated attendees to the meeting (or all attendees designated as required for the meeting). The difficulty of scheduling a meeting may be based at least in part on how far into the future such a commonly unoccupied time block may be found when searching calendar data for the designated attendees.

Other variations are also considered as being within the scope of the present disclosure. In addition, while many illustrative examples are given in connection with meeting scheduling and, in particular, in allowing users to see the calendars of other users, techniques described and suggested herein are applicable in other contexts. For example, various techniques of the present disclosure allow for improved functionality for calendar management systems, such as the ability to propose meeting times using the visibility conditions of various accounts. Moreover, the techniques are generally applicable to other contexts where access to calendar data may be varied, which do not necessarily involve some users viewing on a graphical user interface the calendars of other users (or, generally, accounts in a calendar management system).

FIG. 1 shows an illustrative example of an environment 100 which may be used for the access and other utilization of calendar data in accordance with various embodiments. As illustrated in FIG. 1, the environment 100 includes a calendar server 102 to which are connected various clients 104. In an embodiment, the calendar server 102 is a component of a calendar management system that maintains, in data storage accessible to the calendar server 102, calendar information that, for various accounts of the calendar server 102, indicates the state of one or more calendars. The calendar server 102 may, for instance, store electronic records of appointments in association with accounts of the calendar management system. If a user sets an appointment for his or her account, the calendar server 102 may store a record of the appointment in a manner associating the appointment with the user's account. If the appointment is a meeting and, therefore, has attendees other than the user, the record may be stored in association with accounts of the attendees.

For example, a client device 104 (referred to simply as a client) may receive user input for the scheduling of appointments. The appointments may be transmitted from the client 104 to the calendar server 102 for data storage and/or store a record of the appointment in local data storage. As another example, a user of a client 104 may provide user input to the client 104 in order to input various parameters for a meeting proposal, where the meeting proposal may be a proposal for an appointment having at least one attendee other than the account of the user that organized the meeting proposal. The parameters may, for example, include a start time and end time for the meeting and may identify various invitees (i.e. proposed attendees) selected or otherwise specified by the user. The user may again submit the meeting proposal to the calendar server 102, which may then forward invitations to the meeting (sometimes referred to as meeting requests) to other users. The other users may perform various actions such as accepting the invitations, declining the invitations, proposing new times for the meetings or generally facilitating scheduling of the meeting. The calendar server 102 may store data about the meeting for those identified as participants in the meeting, that is, such as a user that initiated the meeting or one or more invitees to the meeting. In this manner, when users access information about the calendars of others or themselves, they may see, through a user interface, a calendar having details for the meeting displayed.

Various embodiments of the present disclosure allow the maintenance of calendar information in a manner such that different users see different calendar information for the same calendar. Maintaining the calendar information (also referred to as calendar data) may include storing electronic records for appointments as well as visibility conditions for some of the appointments. For example, as illustrated in FIG. 1, each client 104 illustrated in FIG. 1 requests information about a calendar of a user named Ilya Muromets, although not necessarily concurrently, as shown in the figure. As illustrated, each of the users sees a portion of a calendar for the user Ilya Muromets in a different state. For example, a first user, Anastasiya Prekrasnaya, sees a block of time from 9:00 to 10:30 identified as busy. A second user, Aleksey Popovich, sees the same portion of the calendar with free time from 9:00 to 10:00. That is, the user Aleksey Popovich does not see an appointment marked as busy as does Anastasiya Prekrasnaya. A third user, Kateryna Dobraya secs a calendar similar to that seen by the user Anastasiya Prekrasnaya. However, the details of the meeting from 9:00 to 10:30 in this example are different, in this particular instance, the user Kateryna Dobraya sees a block of time from 9:00to 10:30 as busy, but movable. That is, the block of time from 9:00 to 10:30 as viewed by Kateryna Dobraya may be moved to a different time slot, such as a different time slot within the same day or within any time period that has been specified. In this manner, Kateryna Dobraya sees that, for Ilya Muromets, the block of time from 9:00 to 10:30 is undesirable, but usable if, for instance, Kateryna Dobraya feels that there is a good reason for scheduling a meeting in that block of time.

It should be noted that the particular calendar shown in FIG. 1 and the details shown for the meetings are provided for the purpose of illustration and numerous variations are considered as being within the scope of the present disclosure. For instance, some users may see greater detail for occupied blocks of time. For example, instead of merely busy, as illustrated in FIG. 1, an occupied block of time in the calendar may show up to a user with details about the meeting, such as the meeting subject, the meeting location and/or generally other information. Further, the amount of information, as noted, may be varied according to various users or generally in accordance with the various embodiments described herein.

Figure 2:
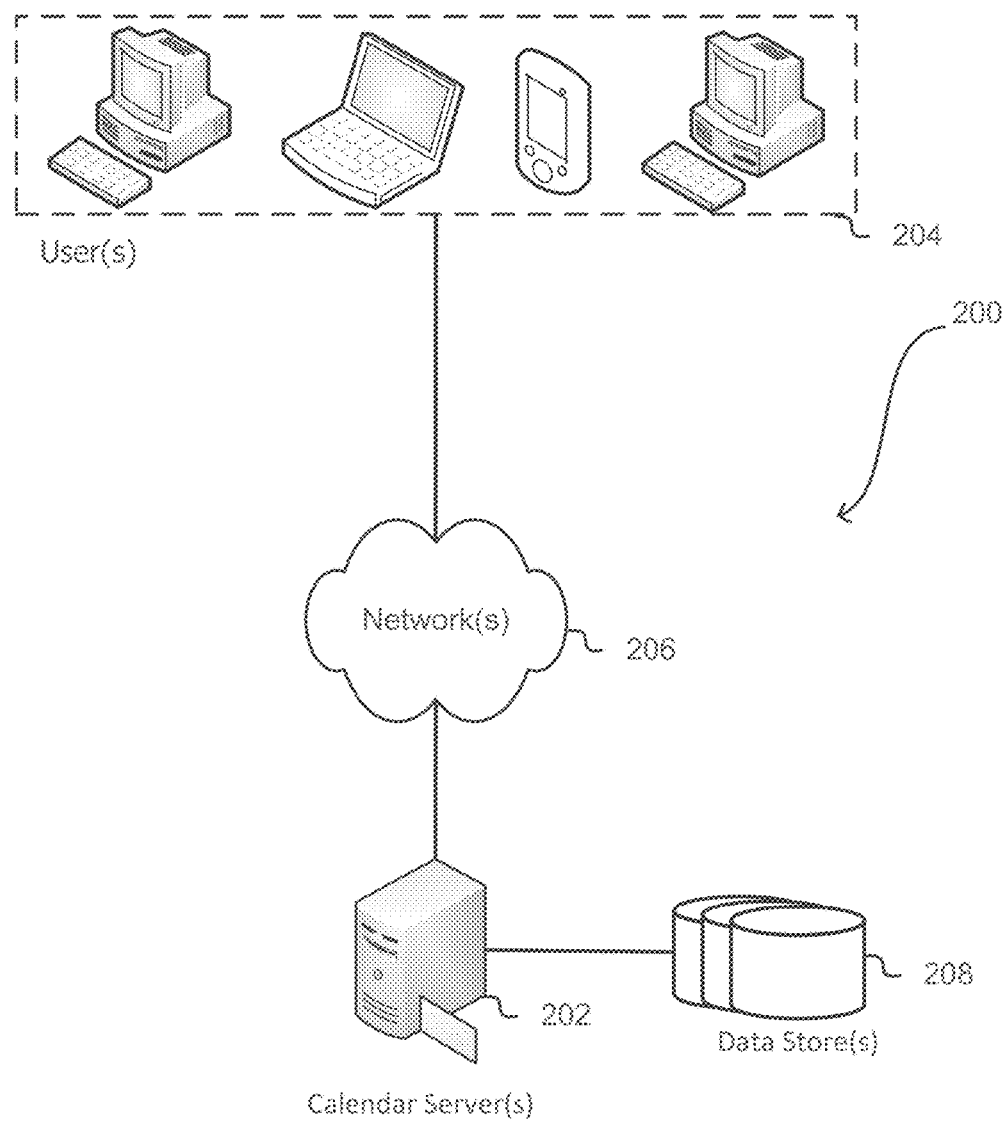
FIG. 2 shows an illustrative example of an environment which may be used to implement a calendar management system, in accordance with at least one embodiment.

FIG. 2 shows an illustrative example of an environment 200 which may be used to implement various aspects of the present disclosure. The environment 200 may, for example, be the environment 100 shown above in connection with FIG. 1. However, more detail to the environment is shown. In an embodiment, the environment 200 includes one or more calendar servers 202 such as described above. It should be noted that, while illustrated as a single calendar server 202, various embodiments of the present disclosure may utilize multiple calendar servers. For example, for large organizations, and/or large groups of users utilizing a calendar management system, multiple calendar servers may be used. For example, a calendar management system may be implemented by a cluster of calendar servers or even multiple clusters of calendar servers distributed over a large geographic area and hosted in different data centers. However, for the purposes of illustration and clarity, embodiments of the present disclosure will be described in connection with a single calendar server.

Returning to the environment 200 of FIG. 2, in an embodiment, various users 204 connect to the calendar server 202 to interact with the calendar server in accordance with the various embodiments described herein. For example, users may connect to the calendar servers to propose meetings, to schedule appointments, to view one's own calendar and/or the calendars of others and to perform other calendar-related tasks. In addition, while the present disclosure describes numerous embodiments in connection with a calendar server, the calendar server may be configured to perform other operations not necessarily connected with time management. For instance, calendar server 202 may be an electronic mail server having a calendar management component. The electronic mail server may, generally, manage personal information on behalf of various accounts. For instance, the calendar server may operate as an email server and may also manage tasks, contact information, notes, journals and/or other information for various users.

In addition, the environment illustrated in FIG. 2 is intended to denote various types of environments which may be used to implement various embodiments of the present disclosure. For example, in an embodiment, the calendar server 202 is a calendar server hosted and maintained by an organization (e.g., a business or other organization) for the management of calendar information (and possibly other information, such as electronic mail) for accounts of the organization, some or all of which may correspond, in a one-to-one manner to employees of the organization. For instance, if the organization is named Example, Inc., the calendar server may implement a personal information management system that manages electronic mail to and from accounts having a domain name of example<dot>com, where <dot> is replaced with appropriate punctuation. As another example, in an embodiment, the calendar server 202 may be a calendar server hosted by an organization that manages calendar information and possibly other personal information for accounts that correspond to users that are not necessarily pan of a common organization. The calendar server 202, which in this example is likely to be, but not necessarily, one or more clusters of calendar servers, may be hosted and managed by an organization that allows members of the general public to set up accounts and use those accounts for the management of their personal information.

As yet another example, the calendar server 202 may be a calendar server hosted by an organization that hosts the calendar server to manage calendar information for multiple organizations. The management of calendar information (and possibly other personal information) for multiple organizations may be performed in various ways. For instance, in an embodiment, a hosting organization may manage personal information for various domains, each domain comprising a set of accounts associated with an organization using the hosting organization's services. Personal information for the various domains may be kept administratively separate. For example, one domain may be prevented from accessing personal information for another domain, absent explicit permissions granted by the other domain. Similarly, administrative management of accounts for a domain may also be kept separate. In this manner, the calendar server(s) 202 may implement a multi-tenant personal information management system. In some embodiments, a hosting organization provides platform as a service services to various organizations, including a personal information management platform service. A customer of the hosting organization may use the personal information management platform to programmatically mange personal information management accounts for the customer and use the platform to make customizations and the like. As yet another example, a hosting organization may provide services that allow customers to programmatically manage computer systems, which may be virtual computer systems, that utilize calendaring and/or other applications of the hosting organization. For instance, a customer may, through a remote user interface, order one or more virtual machines for use in personal information management for the customer. Appropriate machine images may be used to provision the virtual machines, which may then be remotely and programmatically configured by the customer. A single hardware host of the hosting organization may implement multiple virtual machines, many of which may be programmatically managed by different customers. Other techniques for implementing calendar management systems are also considered as being within the scope of the present disclosure.

Users may access information stored by the calendar server 202, using a user interface presented on devices of the user 204. For example, in an embodiment, some users 204 access information made accessible by the calendar server 202, using a personal information management application executing locally on user devices. Such personal information management applications may be configured to interact with the calendar server 202 to exchange information with the calendar server 202. The application may, for instance, include an electronic mail component that enables users to send, receive, compose or otherwise utilize electronic mail. Similarly, a user may use the application to generate a list of tasks, including parameters for those tasks such as a start time, end time, due date reminders and the like.

It should be noted that the calendar saver 202 may be accessed in other ways and through other interfaces. For example, in an embodiment, while not illustrated as such, the environment 200 may include a web server. The web server may provide a web interface to the calendar server 202 to enable users to access information made accessible by the calendar server 202 through a web browser or other application configured to interact with the web server. The web server may, for instance, obtain information from the calendar sever 202 and use the obtained information to generate web pages that are transmitted to appropriate clients 204. Various embodiments may utilize a web server in addition to locally executing applications on user devices 204. For instance, a user may utilize a local application to access information from the calendar server 202 when connected to a trusted network, such as an organization's intranet. When travelling, however, the user may utilize a web interface to interact with the calendar server 202. In addition, applications that interact with the calendar server need not necessarily execute on the user devices. In addition, various embodiments of the present disclosure also include embodiments where user devices include applications that are not necessarily personal information management applications, but that access information from the calendar server 202 using an application programming interface (API) exposed by the calendar server 202 or another device operating with the calendar server 202. Other variations are also considered as being within the scope of the present disclosure. For example, a personal information management application may execute on a server that then provides, over a network, views of the application. Generally, as illustrated in FIG. 2, devices of various types may access information from the calendar server 202. Suitable devices include personal computers, notebook computers, smart phones, tablet computing devices, server computers, and/or generally any device suitable for communicating with calendar server 202 and for presenting information in accordance with the various embodiments described herein.

Further, as illustrated in FIG. 2, users connect to the calendar servers 202 through one or more networks 204. The networks 204 may be any suitable communications network or combination of communications networks, including, but not limited to those discussed below. For example, networks include local internets, the Internet, mobile communications networks and generally any suitable network over which data may be transmitted in accordance with the various embodiments described above.

In an embodiment, the user device submits requests for information to the calendar server 202 over the one or more networks 206. In order to provide a response to the request, calendar server 202 may access information from data storage 208 accessible to the calendar server 202. While illustrated as separate from the calendar server 202 in FIG. 2, it should be noted that, in various embodiments, data storage may be integral with the calendar server 202. The data stores may store various information maintained by the calendar server 202. For example, for various accounts of the calendar server 202. data store 208 may store information about appointments for the accounts. For example, if a user has scheduled an appointment at a particular block of time in his or her calendar, an electronic record of the appointment may be stored in the data store 208. Similarly, if a user has initiated a meeting utilizing calendar server 202, an electronic record for the meeting may be stored in the data store 208. The record may be stored for all users associated with the meeting, such as the organizer and the invitees, or a record may be stored for each account associated with the meeting. It should be noted that, in various embodiments, the user devices may maintain electronic records about appointments, meetings and the like in their own data storage or in another location. Various processes for synchronizing the information between the data store 208 and other data stores maintained by the users 204 may be used to ensure that data is relatively current. Further, as discussed in more detail below, various embodiments of the present disclosure make use of various attributes of users, such as job title, job rank, position in an organizational tree, and other attributes. The data store 208 may store such information in association with appropriate accounts (i.e. accounts of the users whose attribute(s) is/are being utilized) to enable such analysis and/or the calendar server may obtain such information from other locations, such as another server having such information.

Figure 3:
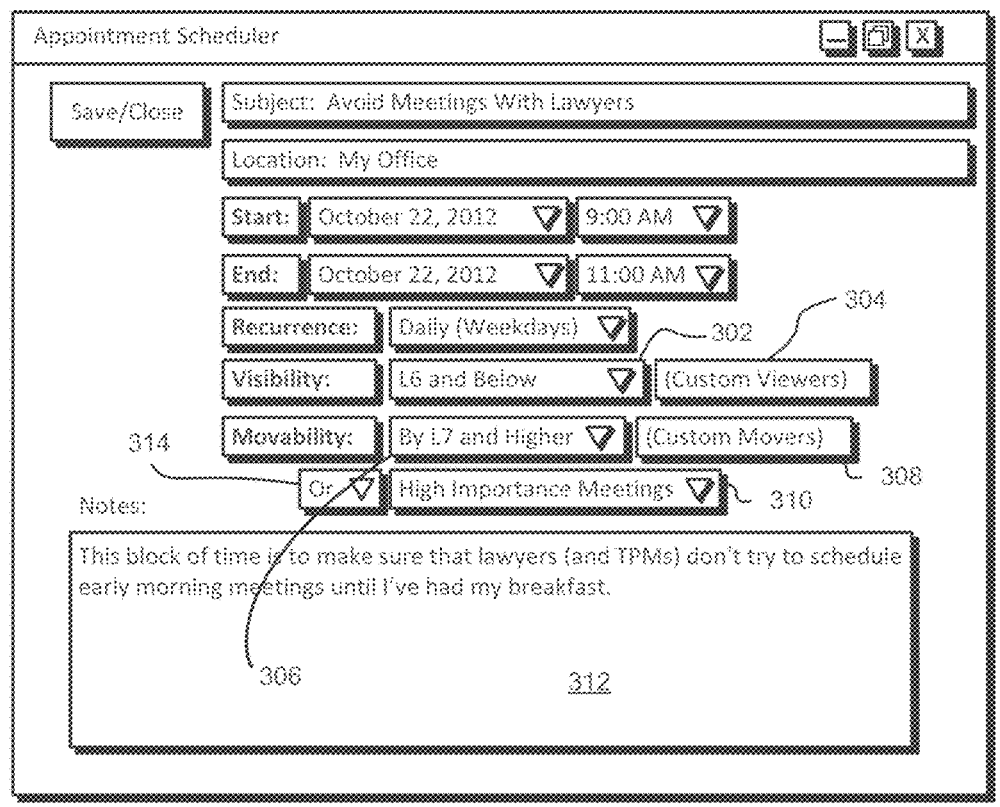
FIG. 3 shows an illustrative example of a user interface for scheduling an appointment in accordance with at least one embodiment.

As noted above, some embodiments of the present disclosure utilize graphical user interfaces to allow users to set parameters for appointments, including visibility conditions for appointments. FIG. 3 shows an illustrative example of a user interface 300 which may be used to schedule appointments in accordance with various embodiments. The user interface 300, and variations thereof, may be presented by an application executing on a client device, such as a user device 204 illustrated in FIG. 2. may be a web interface which may be presented using a browser application, and/or may be presented in different ways. In an embodiment, the user interface may be used by a user to schedule an appointment for an account accessed by the user. The account may, for instance, be an account corresponding to a single user or may be an account accessible by the user for access by multiple users such as a group of users in an organization.

Turning to the details of the user interface 300, the user interface 300 allows for the input of various parameters for a block of time. For instance, starting at the top of the user interface 300, a subject field allows a user to provide user input. The subject field may, for example, be populated using user input from the user corresponding to a string of characters for the subject. A location field, in an embodiment, allows a user to input a location for the appointment, in an embodiment, the user is able to input a string of characters representative of the location, in this particular example, the user has input the words "my office." It should be noted that various ways of inputting the location may be used in accordance with various embodiments. For example, the user interface 300 may provide the user the ability to select from multiple specified locations—for example, the user interface may provide a list of conference rooms in a building from which the user may select. The list of conference rooms and their availability for a block of time may be managed by a calendar management system, such as described above. Further, information for populating selectable locations may be provided by a calendar server. Generally, any way by which a location for an appointment may be specified may be used, including the use of default locations. In addition, as with other fields, including the subject field, a field may be left blank. That is, an appointment need not have a specified location or may have a specified value indicative a lack of location, such as a null value.

In an embodiment, the user is able to use a user interface 300 to input a start date and a start time for the appointment. In this particular example, such abilities are provided through dropdown elements of the user interface 300. A user may, for example, select a start time dropdown box which may cause the user interface 300 to display a monthly calendar with selectable days which may allow for the navigation to other months with selectable days. Similarly, a user may use a time drop down menu to select from a list of times. A user may concurrently or alternatively have the ability, through the user interface 300, to type in dates and times or provide such information in other ways.

In an embodiment, the user interface 300 includes a recurrence field which, in this example, allows a user, through a dropdown box, to select from, multiple options for scheduling the appointment in an recurring manner. In this particular example, a user has selected daily (weekdays) as a recurrence for the appointment, in order to indicate that the appointment should be scheduled, such as every day from Monday through Friday. Various options may be provided for the recurrence such as yearly, monthly, bi-monthly, bi-weekly, bi-yearly, the first Thursday of every month, every Tuesday, and generally in any way a recurrence may be defined.

In an embodiment, the user interface includes one or more fields related to fields identified as visibility. The fields for visibility may enable a user to specify one or more visibility conditions, such as those illustrative examples discussed above. Thus, in an embodiment, the visibility fields of the user interface 300 allow users to specify various conditions for accessing information about a block of time corresponding to the appointment. In this particular instance, the visibility fields allow the user to specify whether or not the block of time of the appointment—in this example, between 9:00 and 11:00 a.m. occurring daily—is shown to another user (accessing through a corresponding account) as free or busy. Various ways of specifying conditions may be implemented. In this illustrative example, a visibility field 302 is implemented as a dropdown box with, selectable options for a job level, in this example, user has selected level 6 and below in order to specify that users with a job level of six and below that view calendar data for the scheduler of the appointment (i.e., for the account for which the user interface 300 is used to schedule an appointment) will see the block of time as busy. Thus, if a level 5 employee requests calendar data for the account of the scheduled appointment, in an embodiment, the person would see a block of time, from 9:00 to 11:00 a.m., as occupied. However, a level 7 employee may see the block of time as unoccupied. Showing (or otherwise indicating) a block of time as occupied or unoccupied may be performed in any suitable manner. For example, a viewer of the account's calendar data rnay be provided a view of a calendar that, when the block of time is indicated as occupied, shows an appointment scheduled in the block of time. Similarly, a viewer of the account's calendar data may be provided a view of the calendar that, when the block of time is indicated as unoccupied, either shows a "free" or "unoccupied" appointment or that merely does not show an appointment in the block of time. Other variations of indicating blocks of time as occupied or unoccupied (or otherwise as being in various states) may be used. Further, as noted above, greater details about the appointment may also be shown to viewers of calendar data, such as subject, location, notes, and/or the like.

In an embodiment, the visibility fields include a custom field 304 that enables a user to specify one or more users who, when viewing calendar data of the user, will see the block from 9:00 to 11:00 a.m. as busy, in the example above using the engineer and administrator, the engineer may use the user interface 300 to specify an account used by the administrator using the custom field. User input may be provided to the custom field 304 in various ways. For example, in an embodiment, selecting the custom field with a mouse, a touchscreen tap, or other user input may cause a directory of users, generally a directory of accounts, to appear or allow selection of individual accounts from the directory. For example, if a particular employee of an organization was tasked with scheduling meetings with engineers and patent attorneys, and if that engineer did not want to have meetings with patent attorneys until he or she arrives at work after 11:00 a.m., he or she could use the custom field to specify the employee tasked with scheduling the meetings. In this manner, in accordance with the various embodiments described herein, the person tasked with scheduling the meetings may, when searching for calendar availability, see a block of time from 9:00 to 11:00 a.m. every day as busy. Therefore, the person tasked with scheduling the meetings may avoid attempting to schedule meetings with the engineer at that time on a workday.

In an embodiment, the user interface also includes movability fields. In an embodiment, movability fields enable a user to specify other users who may see the block of time as movable (or, in some embodiments, specify that block of time is moveable for other purposes, such as for an automated process configured to propose meeting times and/or reschedule the block of time to accommodate another appointment). In this particular example, users, specified by the movability fields, may, when viewing calendar data, view the block of time as occupied, but may see an indication that the block is movable, such as shown above in connection with FIG. 1. In this manner, users attempting to schedule meetings may see that the block is movable and, as a result, be less inclined to avoid the block of time. However, the indication of the block of time being occupied may provide others the incentive to avoid scheduling meetings during that time, when possible. In other words, indicating a block of time as moveable may provide an indication that, when possible, the block of time should be avoided, but that it is available when necessary. As with the visibility fields, the movability fields may enable users to explicitly specify accounts for which the block of time is indicated as movable in various ways. For example, as illustrated in FIG. 3, the user interface includes a movability dropdown box 306 which enables the user to specify a job level or set of job levels. An employee having a job level specified in the movability field may see the block of time as occupied, but movable. Similarly, a custom mover's field 308 enables users to specify specific accounts for a user such as described above.

Similarly, as shown in FIG. 3, a meeting importance field 310 enables users to specify an importance value for a meeting attempting to be scheduled. For example, one user may, through a user interface of a calendar management system, specify parameters for a meeting to be scheduled. One of the parameters may be an importance value for the meeting. For example, possible importance values may be: very important, important, and not important, although other levels may also be used.

As illustrated in FIG. 3, a notes field 312 enables a user to insert notes about the appointment being scheduled. For example, in the particular example of FIG. 3, user input into the notes field 312 indicates that the appointment is being scheduled solely for the purpose of avoiding meetings from 9:00 a.m. and 11:00 a.m. with certain types of people. User may insert a note into the notes field by typing text into the notes field that explains the purpose of the appointment.

As indicated by a Boolean operator field 314, users are also able to create complex visibility conditions. For example, in this example, the user has specified "OR" (through user input or by default) to create conditions that are independently sufficient for indicating the appointment as moveable. In other words, neither condition is necessary for the appointment to be indicated as moveable, although either is sufficient. Numerous variations of setting parameters that define visibility conditions (with a movability condition being a type of visibility condition) may also be used. For example, Boolean and/or other operators may be used for visibility in addition to movability. Similarly, the particular parameters settable through the user interface 300 may vary in accordance with various embodiments. Further, the types of parameters defining visibility conditions may be configurable by the user. For example, a user interface may provide an option for selecting which type of parameters to be used and the user may manipulate the user interface to provide values for the selected parameter types.

Once various parameters for the appointment have been set, using the user interface 300, in an embodiment, user is able to select a save close button 314 of the user interface 300 in order to add the appointment persistently to his or her calendar. Adding an appointment to a calendar may be performed in various ways. For example, in an embodiment where the user uses a device that is a client of a calendar server, selection of the save close button 314 may cause a record for the appointment to be stored in local storage of the client as well as to be transmitted to the calendar server for storage by the calendar server. With a web interface, a record for the appointment and its parameters may be stored at a calendar server, which may then be synchronized with a calendar application.

It should be noted that the particular user interface provided in FIG. 3 and other user interfaces illustrated and/or described herein are solely for the purpose of illustration and that numerous variations are considered as being within the scope of the present disclosure. For instance, FIG. 3 shows a particular arrangement of fields for setting parameters for meetings. Numerous other fields are considered as being within the scope of the present disclosure. Similarly, FIG. 3 shows particular features for scheduling appointments, but a particular user interface need not have all the features illustrated in FIG. 3 or may have more features other than those illustrated in FIG. 3. In addition, user interfaces in accordance with the various embodiments may include additional functionality. For instance, the user interface 300 of FIG. 3 may be configured to enable a user to specify multiple sets of parameters for the appointment and specify visibility conditions that, when processed by a calendar management system, are used to determine which sets of parameters are provided to others. For example, a user may use a user interface to specify two different subjects for the same appointment. Visibility conditions may specify (explicitly and/or by their attributes) which users are provided which subject when, for example, viewing the calendar of the user (i.e., account associated with the user) that provided the two different subjects. Further, visibility conditions may be used to vary numerous details about an appointment (including the existence of the appointment) including, but not limited to: location; length; start time; end time; notes; and/or other information.

Figure 4:
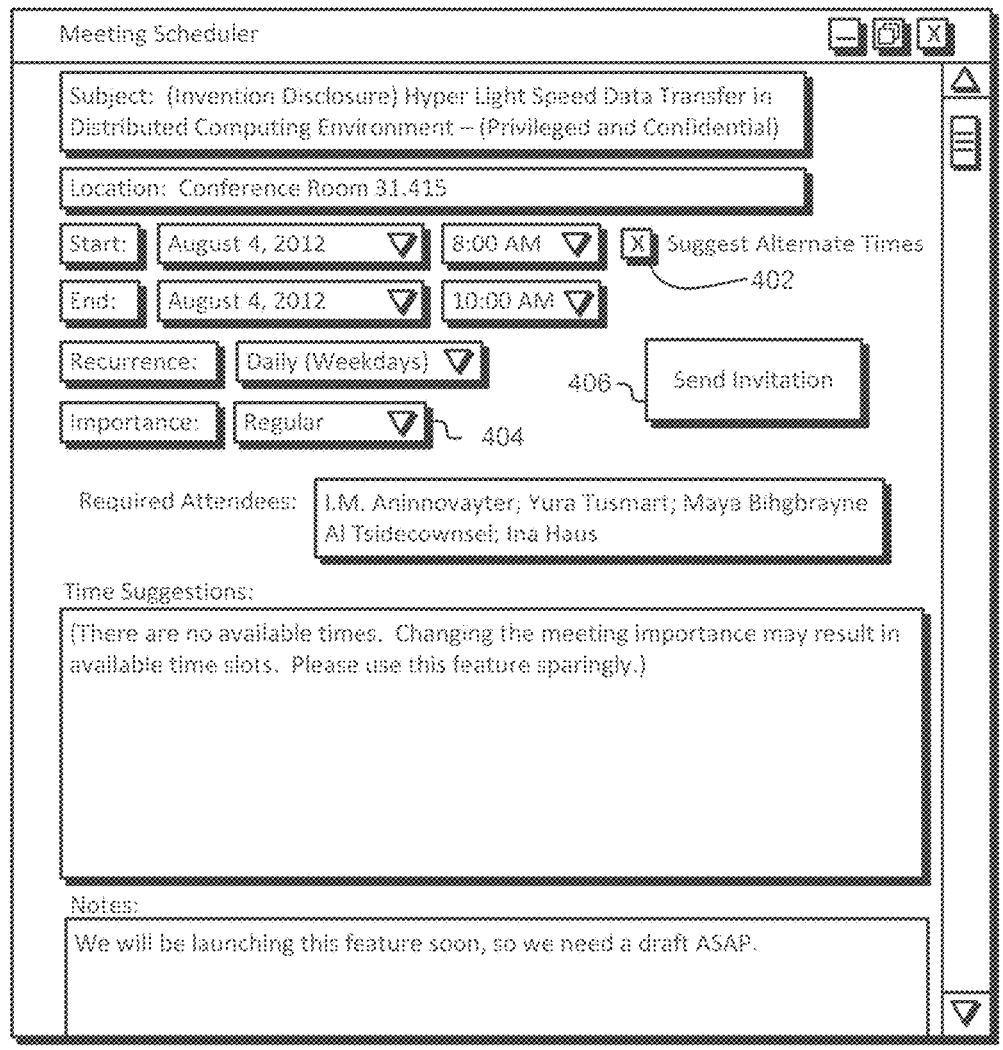
FIG. 4 shows an illustrative example of a user interface for scheduling a meeting, in accordance with at least one embodiment.

Generally, visibility conditions may be used to provide access to calendar data in various ways. In various embodiments, visibility conditions may be used to vary access to calendar data in connection with scheduling tools. For example, a user interface of a scheduling tool may provide views of various users' calendars to enable a scheduler to select an appropriate tune for a meeting proposal. In addition, automated processes, which may be implemented at a calendar server or in another suitable location, may use visibility conditions to search calendar data to generate meeting time proposals. FIG. 4 shows an illustrative example of a user interface 400 for scheduling a meeting which may make use of various techniques described herein. As noted, a meeting may be an appointment having multiple attendees, that is, at least one attendee other than the organizer of the meeting. Thus, in various embodiments, a meeting is a special type of appointment, although in various embodiments, meetings may be distinguished from appointments in other ways. In an embodiment, the user interface 400 includes various user interface elements that enable a user to specify parameters for a meeting. For example, in an embodiment, the user interface 400 enables a user to input a subject for the meeting and a location for the meeting, as well as a start time and an end time, and a recurrence such as described above in connection with FIG. 3.

In addition, the user interface 400, in accordance with an embodiment, allows the user to incorporate flexibility into meeting scheduling. For example, a check box 402 enables a user to indicate whether he or she would like to have alternate times suggested. A user may select the check box 402 for a meeting that the organizer (i.e., the user using the user interface 400) desires to be scheduled, but not at any particular time, perhaps within some constraints (e.g., within the next two weeks). As a result of selecting the check box 402, a time suggestion field may appear and/or be populated with information in the user interface 400. Information may be provided about alternate times in the time suggestion field 400. For example, in this particular example, a textual message indicating that there are no available times for the meeting is presented. In addition, a note indicating to the user that he or she may suggest how to find alternate times is also presented. In this particular example, a suggestion is made to the user to change the importance of the meeting in order to cause available times for the meeting to be found. The time suggestion box may be populated in various ways, which may utilize communication between a client presenting the user interface 400 and a server, such as a calendar server described above. For example, upon selection of the checkbox 402, any parameters for the meeting that have been specified may be transmitted to the server for processing by the server. The server may then perform a search of calendar data for calendar data for specified attendees (including the organizer of the meeting) for mutually unoccupied time blocks. The calendar data to be searched may be determined by the server (or another server) according to visibility conditions set for various time blocks by any of the attendees (including the organizer of the meeting). Further, as parameters are updated for the meeting, updated parameters may be transmitted to the server, which may then reprocess the calendar data according to applicable visibility conditions and provide updated time suggestions, if any are available. In this particular example illustrated in FIG. 4, no suggestions are given. There could be various reasons for this. As one example, one of the attendees may have scheduled dummy appointments on a recurring basis so that the attendee's schedule is always filled. As another example, the calendar data to be searched may be obtained according to a default value of how far into the future to search (e.g., one month). Further, the server may also search within a certain time period every day (e.g. 9:00 AM to 5:00 PM) and only for certain days (e.g., Monday through Friday excluding certain holidays). The default(s) may be user configurable (e.g., through user-configurable application settings) and, in some embodiments, the amount of time searched in the future is configurable directly on the user interface itself. Further, it should be noted that calendar data may not be available for all attendees. For example, one or more attendees may have accounts with a different calendar management system that has not provided access to corresponding calendar data, or a different personal information management system that does not include a calendar management system component. Such may be the case, for instance, when one or more attendees work for a different organization that uses a different electronic mail system. In cases where calendar data is unavailable for all specified attendees, a calendar management system may operate on the assumption that all time blocks for the specified attendees are unoccupied.

As noted above, invitees to the meeting may have scheduled one or more appointments that have conditions for how the appointment appears to other users. As a result, the user may use the user interface 400 to adjust a value specified in an importance dropdown menu 404 that allows the user to specify the importance for the meeting. Changing the importance to "high," for instance, may cause additional time blocks to become available because one or more invitees to the meeting may have specified that a time block will show as unoccupied only for meetings indicated with high importance. Generally, the parameters for the meeting may be adjusted in order to identify additional blocks of time available for scheduling the meeting.

In an embodiment, a send invitation button 406 may be selected by the user to cause a proposal for the meeting to be sent to individuals specified as attendees of the meeting. For example, in the environment illustrated in FIG. 2, a client implementing the user interface 400 may submit parameters for a meeting to an email server 402 which may distribute invitations to the meeting to invited individuals, that is, individuals indicated as attendees to the meeting. The individuals may receive the invitations in an electronic mail user interface and may accept, decline or otherwise respond to the invitations. Accepting a meeting invitation (in some embodiments either affirmatively or tentatively) causes an appointment for an account that accepted the meeting invitation to be stored in a record for the appointment in a calendar management system, such as described above. As noted, local storage of records for appointments may also be utilized.

Figure 5:
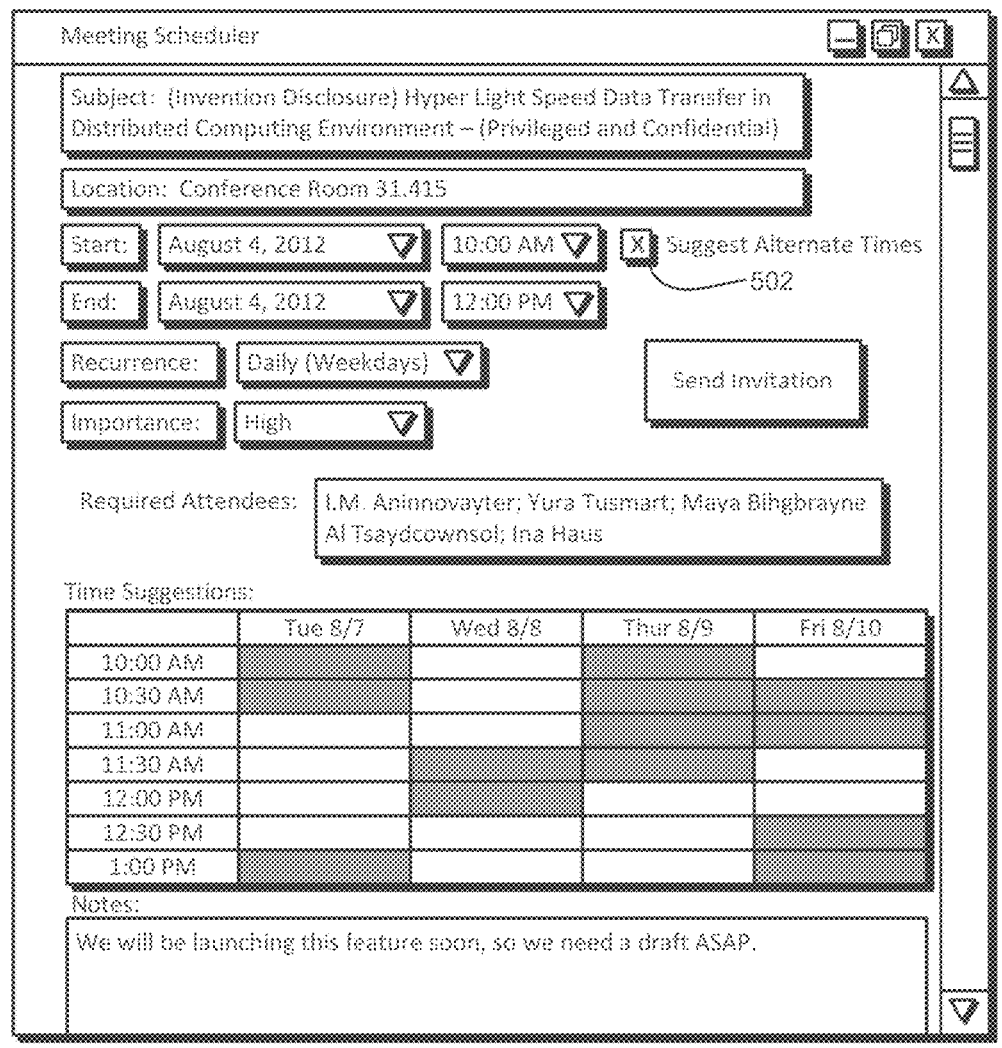
FIG. 5 shows an illustrative example of a user interface for scheduling a meeting, in accordance with at least one embodiment.

FIG. 5 shows an illustrative example of a user interface for scheduling a meeting in accordance with various embodiments. The user interface 500 may be, for example, the user interface 400 described above in connection with FIG. 4 after a user has adjusted meeting parameters. For example, the user interface 500 includes a check box 502 for causing time suggestions for the meeting to be provided to the user, in this particular example, however, the start and end time for the meeting is different as is the setting for meeting importance. As a result of the increased importance value, time suggestions have been populated in the time suggestion box. In this example, time suggestions appear as a matrix with rows corresponding to times and columns corresponding to days. Blocks in the matrix may be visually distinguished according to whether time blocks are available for scheduling or not. In this instance, blocks colored white are available while dark blocks are unavailable, although other schemes are within the scope of the present disclosure. While not illustrated as such, the matrix may be navigable and manipulable to allow, for example, views of different ranges of days and time, including different ranges of the same length and/or different ranges of different lengths. For instance, a month view may be provided. Scroll bars and/or other user interface navigation controls may be provided and, in some embodiments, the matrix may be navigable and manipulable using a touchscreen gestures.

As with all interfaces illustrated and described herein, variations are considered as being within the scope of the present disclosure. For example, suggestions for meeting times may be provided in any suitable manner, such as a list of available times, and the like. Also, as illustrated in FIG. 5, blocks of time are color coded based on whether the blocks are available for scheduling or not. Color coding may also be more complex. For example, occupied time blocks may get one color, unoccupied blocks may get another color, and occupied time blocks with moveable meetings and/or occupied time blocks with associated visibility conditions that indicate the time blocks should be indicated as occupied may get another color, in addition, different time blocks may be visually distinguished in different ways, such as with textual information and/or in other ways.

Figure 6:
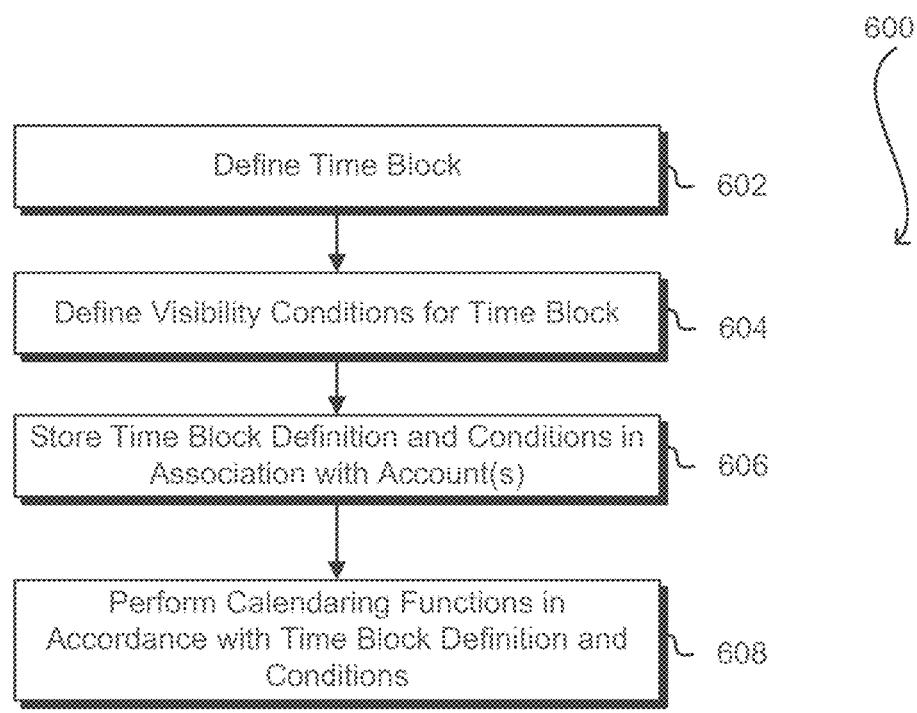
FIG. 6 shows an illustrative example of steps for a process for performing calendaring functions, in accordance with at least one embodiment.

FIG. 6 shows an illustrative example of a process 600 for performing calendar functions in accordance with various embodiments. The process 600 may be performed by any suitable device such as by a calendar server such as described above. Some or all of the process 600 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In an embodiment, the process 600 includes defining 602 a time block and defining 604 visibility conditions for the time block. Defining the time block and visibility conditions for the time block may be performed in any suitable manner such as described above. For example, the time block and visibility conditions may be defined by user input into an interface and submission of the time block and conditions (e.g. parameters) for the time block to a calendar server such as described above. A time block and/or visibility conditions for the time block may also be defined by an automated process and/or by one or more default settings. The process, in an embodiment, includes storing 606 the time block definition and conditions in association with one or more accounts. The accounts may be accounts of a calendar management system such as described above. Finally, in an embodiment, the process 600 includes performing 608 calendaring function in accordance with time block definitions and conditions. For example, as described above, calendaring functions may include the scheduling of appointments and/or meetings and/or providing suggestions for such scheduling. However, other calendaring functions in addition to those explicitly described are considered as being within the scope of the present disclosure.

Figure 7:
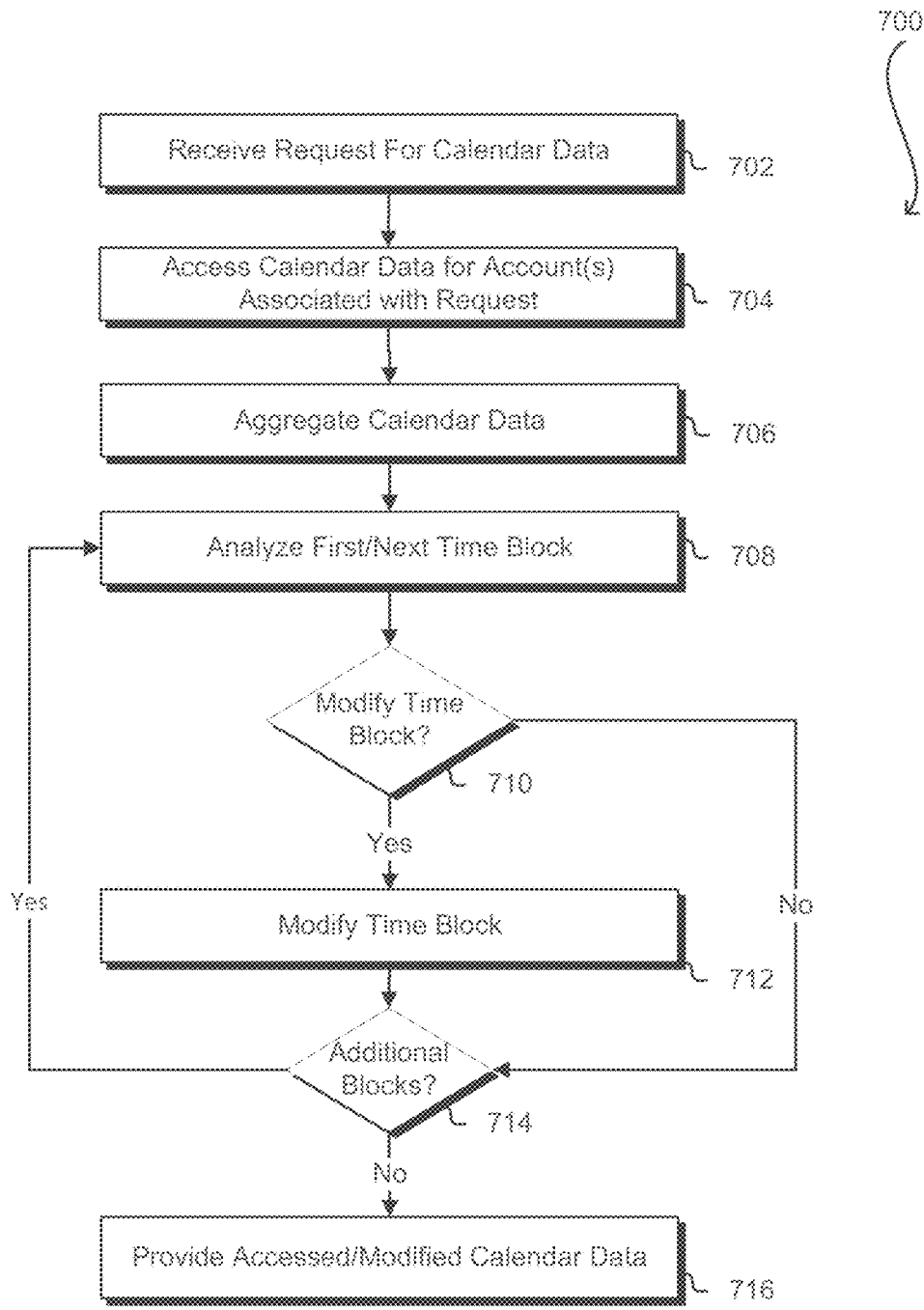
FIG. 7 shows an illustrative example of stops for a process for providing calendar data, in accordance with at least one embodiment.

As noted, various embodiments of the present disclosure utilize techniques for providing access to calendar data. FIG. 7, accordingly, shows an illustrative example of a process 700 for providing access to calendar data in accordance with various embodiments. The process 700 may be performed, for example, by a calendar server, such as described above, although, as with other processes and operations described herein, the process 700 may be performed by any suitable device that manages calendar data. In an embodiment, the process 700 includes receiving 702 a request for calendar data. Receiving a request for calendar data may be made in any suitable manner and may be made in a variety of contexts in accordance with various embodiments. For example, the request for calendar data may simply be a request submitted by an application of a user for calendar data to enable a user to view appointments and meetings of another user. As another example, the request may be submitted as part of an electronic invitation for a meeting. Such an invitation may have be generated according to user input provided to user interface, such as described above in connection with FIGS. 4-5. Generally, a request may be made in any suitable manner. In addition, in various embodiments, a request for calendar data may include one or more parameters for a proposed meeting, such as identifiers of attendees, an initial time block proposal, a meeting duration value, an importance value, and/or other parameters. Further, the request may originate from another calendar management system different from a calendar management system that receives the request. In this example (as well as other examples), the other calendar management system may provide information necessary to authenticate the request, such as an identifier of an account of the other calendar management system and/or other credentials. However, in some embodiments, authentication of the request may not be required and/or whether authentication is required may be a user-configurable setting. The request may also be made pursuant to an application programming interface (API) call along with any parameters necessary to receive an intended response to the API call, e.g. a response with the requested data instead of a rejection of the request.

The process 700, in an embodiment, includes accessing 704 calendar data for one or more accounts associated with the request. For example, if the request identities multiple accounts, calendar data for the multiple accounts may be accessed. It should be noted that accessing calendar data may be performed in multiple ways. For example, a calendar server may have access to some or all of the requested calendar data. Accessing calendar data (in the process 700 and/or in other processes) may also include requesting and receiving some or all calendar data from one or more other systems, one or more of which may be third party systems. In such instances, appropriate authentication and/or policy enforcement techniques may be employed to ensure that access from other systems is authorized. Further, as noted above, accessing calendar data may not be performed for some or all of the attendees of a meeting, such as attendees for which calendar data is unavailable to a system performing the process 700.

In an embodiment, the accessed calendar data is aggregated 706. Aggregating the accessed calendar data may be performed by collecting accessed calendar data for multiple accounts and combining it. Combining the accessed calendar data may be performed by creating a collection of blocks corresponding to the time blocks based at least in part on the accessed calendar data for the accounts. Aggregating the access calendar data may also include separating blocks of time into multiple blocks of time according to intersections of blocks of time for different accounts. As an illustrative example, if a first account has an appointment from 9:00a.m. to noon, and a second account has a meeting from 10:00 a.m. to 11:00 a.m. on the same day, the time block from 9:00 a.m. to noon may be divided into three time blocks, the first time block being the time block from 9:00 a.m. to 10:00 a.m., the second time block being from 10:00 a.m. to 11:00 a.m. and the third time block being from 10:00 a.m. to 12:00 p.m. Conditions for time blocks may be allocated accordingly. For example, using the present example, if the second account has set one or more conditions for calendar visibility such as in the manner described above, for the time block from 10:00 to 11:00, those conditions may be associated with the time block from 10:00 to 11:00. However, the time block from 9:00 a.m. to 10:00 a.m. and the time block from 11:00 a.m. to 12:00 p.m. may not have those conditions associated with it. In this manner, the time block from 10 to 11 and the time block from 11 to 12 can be analyzed separately from the time block from 10 to 11.

Conditions for time blocks may also be aggregated. For instance, in the present example, if the first account's appointment has a first set of visibility conditions and the second account's appointment has a second set of visibility conditions, the time block of 9:00 a.m. to 10:00 a.m. may have the first set of visibility conditions, the time block of 10:00 a.m. to 11:00a.m. may have the union of the first set and second set of visibility conditions, and the time block from 11:00 a.m. to noon may have the first set of visibility conditions.

As another example, a first account has an appointment from 9:00 a.m. to 3:00 p.m., a second account has an appointment from 10:00 a.m. to 12:00 p.m., and a third account has an appointment from 11:00 a.m. to 2:00 p.m. Each appointment has a first, second, and third set of visibility conditions associated with the appointment, respectively. Aggregating such calendar data may be performed by aggregating the appointments into five separate appointments based on the intersections of the appointments. The time blocks for the new appointments may be as follows: a first time block from 9:00 a.m. to 10:00 a.m. may have the first set of visibility conditions; a second time block from 10:00 a.m. to 11:00 a.m. may have the union of the first and second sets of visibility conditions, since this block is where the first and second (original) appointments intersect, but not the third; a third time block from 11:00 a.m. to 12:00 p.m. may, accordingly, have the union of the first, second, and third sets of visibility conditions; a fourth time block from 12:00 p.m. to 2:00 p.m. may have the union of the first and third visibility conditions; and a fifth time block from 2:00 p.m. to 3:00 p.m. may have the first set of availability conditions.

Returning to the process 700, in an embodiment, the process 700 includes analyzing 708 a first time block. Analyzing the first time block may be performed in any suitable such as by determining whether any conditions apply to the time block, whether any of the conditions applicable to the time block, if any, are fulfilled by parameters for the time block and/or otherwise. A determination may then be made 710 whether to modify the time block. Modifying the time block may be done in any suitable manner. For example, determining whether to modify the time block may include determining whether to change the state of the time block from an occupied state to an unoccupied state (or, generally, from one state to the other). Accordingly, if it is determined to modify the time block, in an embodiment, the process 700 includes modifying 712 the time block in accordance with the determination that was made 710. A determination may then be made 714 whether there are additional time blocks. If there are additional time blocks, then, in an embodiment, the process 700 includes analyzing 708 the next time block, determining 710 whether to modify the next time block and, if so, modifying the time block. If it is determined 710 not to modify the time block, the process 700 may include determining 714 whether there are additional time blocks. This process may repeat until it is determined 714 that there are no additional time blocks at which time the process 700 may include providing 716 the accessed and/or modified calendar data. Providing the access to modified calendar data may be performed in any suitable manner such as providing the data in a response to the request that was received 702 and/or otherwise making the calendar data available for access to one or more authorized users. In addition, providing the modified calendar data may include further modifying the calendar data, such as by restoring at least some of the data that was changed during an aggregation/collection process.

As with all processes described herein, variations are considered as being within the scope of the present disclosure. For instance, as described above, the process 700 includes aggregating accessed calendar data from multiple accounts when the requested calendar data includes a request for calendar data front multiple accounts. However, other ways of processing calendar data for the accounts may be used. For example, in some embodiments, a more primitive technique may be used where each unit of time (e.g., half-hour time block) is analyzed to determine if, after application of any applicable visibility conditions (from any intersecting appointment with associated visibility conditions), the time block is mutually unoccupied (i.e., unoccupied for each account for which calendar data is available). If enough time consecutive mutually unoccupied time blocks are found, their union (or time intervals in the union of sufficient length) may be identified as unoccupied in the provided data. In addition, the process of aggregating time blocks may also be performed by consolidating time blocks. For example, adjacent lime blocks having the same or no conditions associated therewith may be combined so as to reduce the amount of total analysis.

Figure 8:
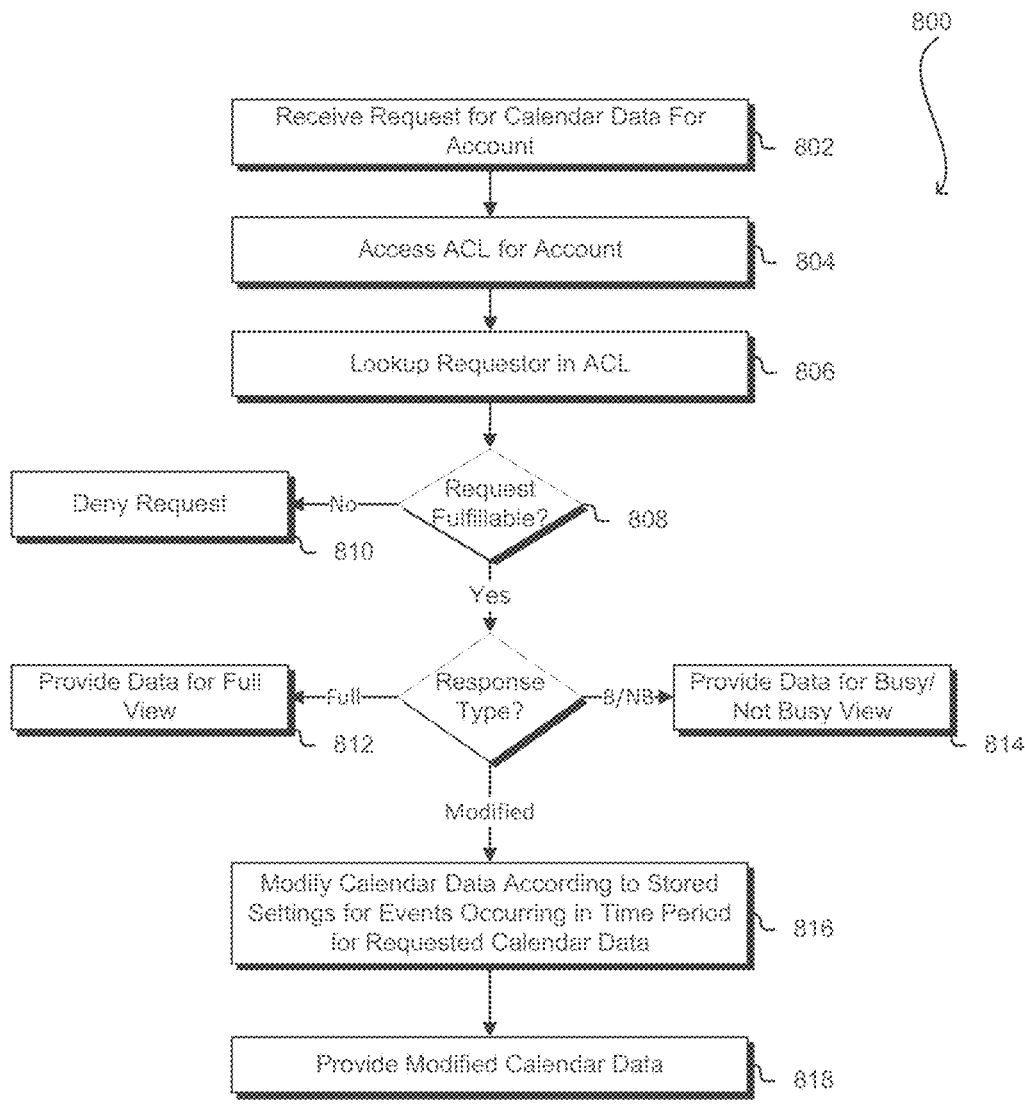
FIG. 8 shows an illustrative example of steps for a process for providing calendar data, in accordance with at least one embodiment.

Various embodiments of the present disclosure are related to providing varied access to calendar data based at least in part on identities. For instance, various embodiments of the present disclosure allow the use of visibility conditions in a manner taking into account particular accounts associated with a meeting request. FIG. 8, accordingly, shows an illustrative example of a process 800 for providing calendar data in accordance with user identities and, in particular, using an access control list (ACL) to determine how to provide access to a requestor for access, based at least in part on the identity of the requestor. The process 800 may be performed by any suitable device that provides access to calendar data, such as a calendar server implementing a calendar management system, as described above. In an embodiment, the process 800 includes receiving a request for calendar data for an account, such as an account of calendar management system performing the process 800. The process 800 may then include accessing 804 an access control list (ACL) for the account. The ACL may identify one or more accounts and one or more privileges associated with the accounts, from the perspective of the account for which the calendar data was requested. In this particular example, the privileges define whether a request in connection with an account is provided a response and, if so, the type of response, such as described below.

The requestor, that is, an account in connection with the request was received, may be looked up 806 in the ACL. A determination may then be made 808 whether the request is fulfillable. For example, in some embodiments, a calendar management system uses the ACL to determine who has access to calendar data of other users. For instance, users may, through a user interface of an application, specify which other users can access calendar data for their account, in addition, various levels of access may be provided. In one embodiment, for example, users are able to specify certain users that are able to see occupied and unoccupied blocks of time, but not details associated with those occupied blocks of time such as meeting subjects, locations and the like. Accordingly, in an embodiment, if it is determined 808 that the request is not fulfillable, then the request may be denied 810. Denying the request may he performed in any suitable manner such as by transmitting a message to the requestor that the request has been denied and/or simply not providing access. If it is determined 808 that the request if fulfillable, then, in an embodiment, a determination is made 812 what type of response to provide.

While various embodiments may utilize more or fewer response types, in an embodiment, there are three types of access providable to calendar data; full access, whereby data is provided in an unmodified manner; busy/not busy access in which time blocks are specified as either occupied or unoccupied; or modified, whereby calendar data is modified and provided in response to the request. Accordingly, in an embodiment, if it is determined 812 whether the response type is a full response type, then data for a full view of the requested data is provided 814. Thus, in an embodiment, all occupied blocks of time and details for the occupied blocks of time are provided 814 when the response type is a full response type. Similarly, if it is determined 812 that the response type is a busy/not busy response type, data tor a busy/not busy view is provided 816. As noted, data for a busy/not busy view indicates time blocks that are occupied, but obfuscates (e.g., does not include) details associated with those time blocks, such as meeting subjects, appointment subjects, locations and the like. If it is determined 812 that the response type is a modified response type, calendar data is modified 818 according to stored settings for appointments occurring in the time period for the requested calendar data.

As noted above, modifying the calendar data may be performed in any suitable manner such as by changing the state of a block of time from occupied to unoccupied. Changing the state of a block of time from occupied to unoccupied may be performed by changing the value of a variable for the block of time, by simply removing the block of time from a response being generated, and/or in any suitable manner. Accordingly, in an embodiment, the process 800 includes providing 820 the modified calendar data, such as described above.

As with other processes, variations of the process 800 are within the scope of the present disclosure. For example, FIG. 8 is illustrated with three possible response types: Full, Busy/Not Busy and Modified. As noted, different numbers of response types may be utilized in various embodiments. For instance, in some embodiments, there are at least two response types; Full and Busy/Not busy. Determining whether to provide a modified response may follow from a determination to provide a Busy/Not Busy response type. Thus, in this example, a modified response type is a sub-type of a Busy/Not Busy response type. For example, after determining to only show calendar information as being busy or not busy, a determination may be made whether to change for the response one or more blocks of time from busy to not busy and/or from not busy to busy.

Figure 9:
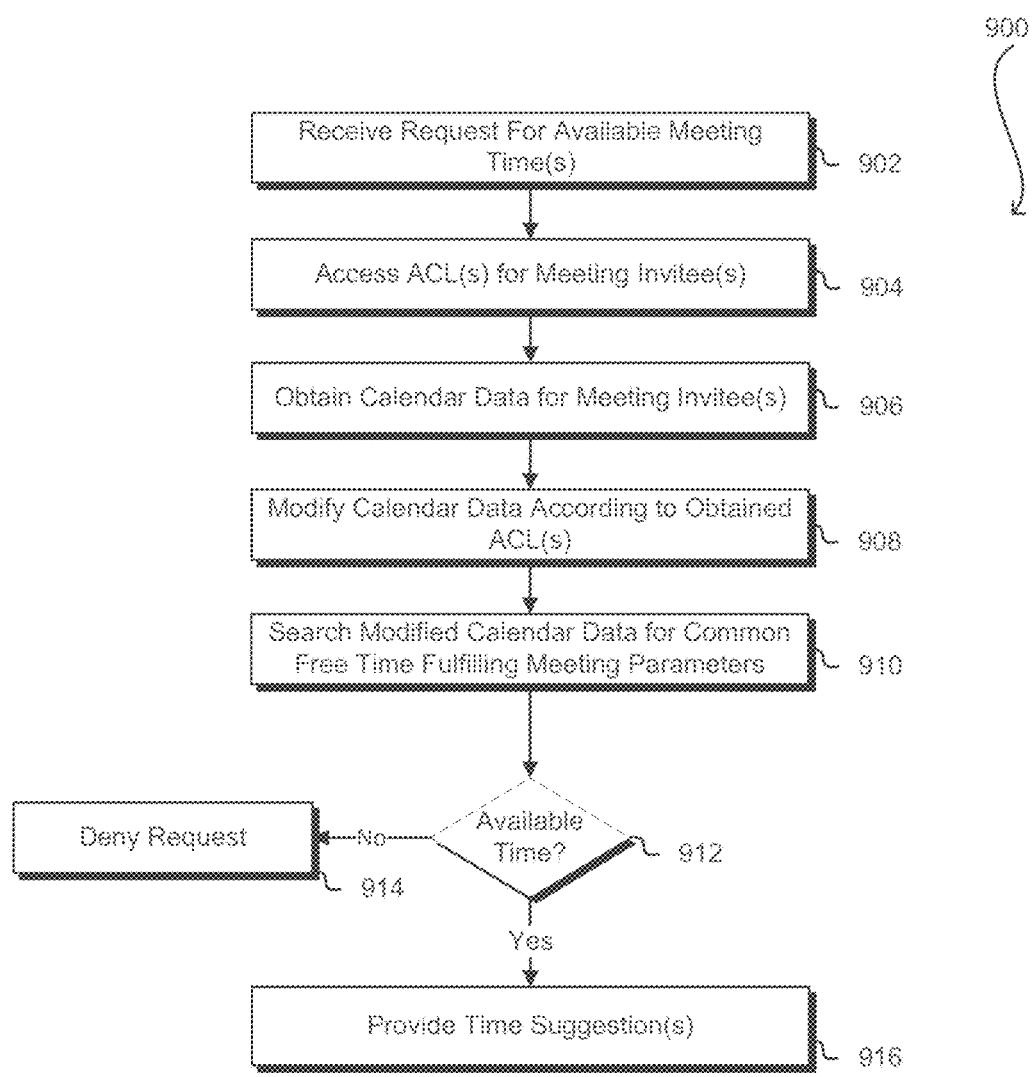
FIG. 9 shows an illustrative example of steps for a process for providing appointment time suggestions, in accordance with at least one embodiment.

Various embodiments of the present disclosure also enable the systems, such as calendar management systems, to provide suggestions for meeting times in accordance with various embodiments. FIG. 9 accordingly shows an illustrative example of a process 900 for providing meeting time suggestions. The process 900 may be performed by any suitable device that manages calendar data, such as a calendar server implementing a calendar management system, such as described above. In an embodiment, the process 900 includes receiving 902 a request for one or more available meeting times. The request for one or more available meeting times may be performed as described above. For example, the request may specify one or more parameters for a meeting such as invitees for the meetings and/or one or more conditions for the meetings, such as a time period in which the meeting should be scheduled. The process accordingly, in an embodiment, includes accessing 904 one or more ACLs for any meeting invitees specified in the request (or otherwise known). Calendar data for any meeting invitees may also be obtained 906, such as described above. It should be noted that, as with other operations in the process 900 or other processes described herein, the order illustrated is not necessarily the order in which it is performed, unless otherwise clear from context. For example, FIG. 9 shows accessing ACLs for meeting invitees as occurring before obtaining 906 calendar data for meeting invitees. However, these operations may be performed in a different, order or in parallel.

The process 900, in an embodiment, includes modifying 908 calendar data according to the obtained ACL(s) for any meeting invitees. The calendar data may be modified such as described above. The modified calendar data may then be searched 910 for common free time for fulfilling meeting parameters. Searching 910 the modified calendar data for common free time fulfilling meeting parameters may be performed by locating blocks of time or continuous blocks of time in which the modified calendar data does not indicate a conflicting appointment for any of the applicable meeting invitees or for the originator of the meeting. A determination may then be made 912 wherever there is available time. If there is not available time, then the request may be denied 914 such as described above in connection with FIG. 4, or in any suitable manner. If it is determined 912 that there is available time, then one or more meeting time suggestions are provided 916 such as described in connection with FIG. 5 or in any suitable manner. For example, a list of potential meeting times may be provided or potential meeting times may be provided in a calendar format, such as described above and such as illustrated in FIG. 5.

Figure 10:
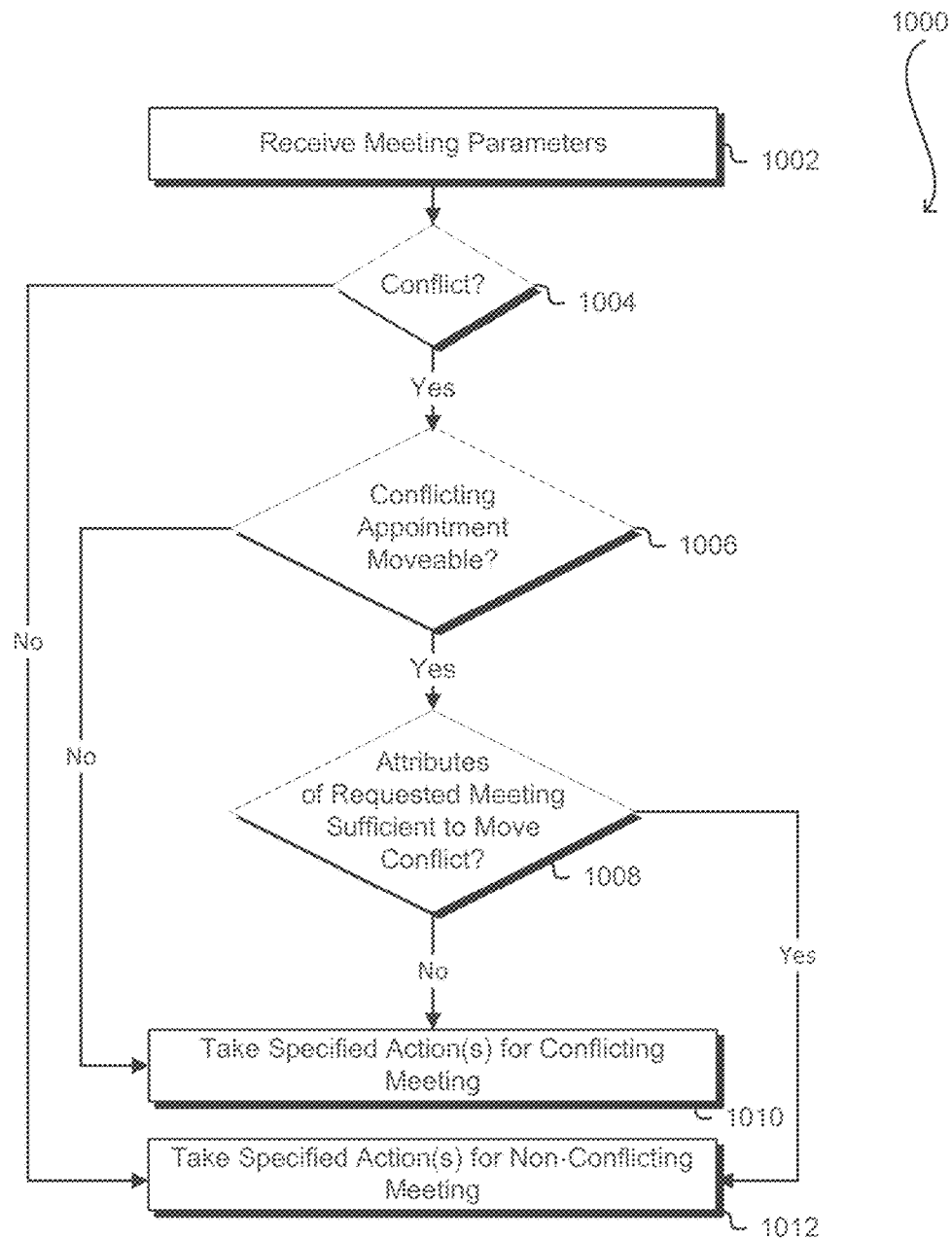
FIG. 10 shows an illustrative example of steps for a process for taking actions in accordance with movable appointments, in accordance with at least one embodiment.

Various embodiments of the present disclosure also enable calendar functions to be performed in accordance with movable appointments, that is, appointments that are specified, by a user through user input specific to the appointments and/or by default, as being able to be moved to a different time block. In an embodiment, FIG. 10 shows a process 1000 for performing calendar functions in accordance with movable appointments in accordance with various embodiments. The process 1000 may be performed by any suitable device, such as a calendar server implementing a calendar management system, such as described above. As with other processes described herein, the process 1000 may also, in some embodiments, be performed by a client device or other device, such as an application server that interacts with a calendar server. In an embodiment, the process 1000 includes receiving 1002 meeting parameters such as described above. The meeting parameters may be received in numerous ways. For example, the meeting parameters may be received as a result of a user having submitted an electronic meeting proposal (e.g., meeting invitation), perhaps by using the user interface described above in connection with FIGS. 4-5, variations thereof, or another such interface. The meeting parameters may also be received in other ways. For example, the parameters rnay be received in connection with the user interface described above in connection with FIGS. 4-5, variations thereof, or another user interface, but before the user provides user input indicating submission of the electronic meeting proposal (e.g., by selecting "Send Invitation" in FIG. 4 or FIG. 5). Parameters may be received in. generally, any suitable way, such as from an automated process (e.g., searching for a suitable time within the parameters) or as a result of use of a user interface that is for a purpose other than generating meeting proposals.

Upon receipt of the meeting parameters, a determination may then be made 1004 whether there is a conflict. For example, the determination may determine whether the meeting request indicates a block of time that intersects with a block of time for an existing appointment and/or a buffer time automatically scheduled around an appointment (e.g., to allow travel from one location to the next between appointments). A determination, accordingly, is then made 1006 whether the conflicting appointment is movable. Determining 1006 whether the conflicting appointment is movable may be performed in any suitable manner. For example, movability of a conflicting appointment may be explicitly specified via metadata for the conflicting appointment. In other words, movability may have been specified as a parameter for the conflicting appointment. As another example, an analysis may be performed based at least in part on parameters for the conflicting appointment and/or the meeting request. As just one example, a meeting (for which the meeting parameters were received) and the conflicting appointment may each have associated importance values (which may be stored values or dynamically calculated values calculated at the time of performance of the process 1000). Determining whether the conflicting appointment is moveable may be performed by comparing the importance values to determine whether the meeting has a higher importance value or, alternately, whether the importance value for the meeting exceeds the importance value for the conflicting appointment by a sufficient amount. As another example, determining whether the conflicting meeting is moveable may be performed by analyzing parameters for the conflicting appointment to determine whether the conflicting appointment satisfies one or more movability criteria set for the meeting, such as being easily rescheduled, where "easy" is defined by the conditions (e.g., can be rescheduled in an unconflicting block of time within a certain amount of time into the future). As yet another example, determining whether the meeting is moveable may be performed by prompting a user (e.g., user who has generated the meeting request and/or user whose appointment is conflicting) for user input indicating that the conflicting appointment is moveable. A determination whether the conflicting appointment is moveable rnay also take into account the existence of unoccupied time scheduled for the account in a particular time period, such as the same day or same week. It should be noted that, while moveable meetings are used for the purpose of illustration, the process 1000 may be modified to operate in accordance with whether the conflicting meeting is cancelable.

If it is determined 1006 that the conflicting appointment is movable, then another determination may then be made 1008 whether the attributes of the requested meeting arc sufficient to move the conflicting appointment, such as described above. As noted above, determining 1006 whether the conflicting meeting is moveable may include determining whether parameters for the meeting are sufficient, for moving the conflicting appointment. Accordingly, the determinations 1006, 1008 may be performed as a single determination.

In an embodiment, if it is determined 1008 that the attributes of the requested meeting are insufficient for moving the conflicting appointment, then one or more specified actions for conflicting meetings rnay be taken 1010. Similarly, the one or more specified actions for conflicting meetings may be taken 1010 upon a determination 1006 that a conflicting appointment is not movable. Similarly, if it is determined 1008 that attributes of the requested meeting are sufficient to move the conflicting appointment or it is determined 1004 that there is not a conflict between the meeting and the appointment, then one or more specified actions for non-conflicting meetings may be taken 1012.

The actions taken for conflicting or non-conflicting meetings may vary in accordance with various embodiments. The actions may, for example, depend from the context in which the process 1000 is being performed. Also, the specified actions may be user-configurable. Possible specified actions tor conflicting meetings may include, when applicable, one or more of the following actions: rejecting a meeting request for the meeting, transmitting an electronic message notifying of the conflict (e.g., to an organizer of the meeting and/or an account of the conflicting appointment); prompting an account of the conflicting appointment for consideration of whether the appointment can be moved; searching for an alternate meeting time; and/or other actions. The actions for non-conflicting meetings may include: scheduling a meeting (i.e., storing and/or modifying an electronic record for the meeting); notifying the meeting organizer and/or one or more invitees to the meeting; rescheduling the appointment; and/or other actions.

As with all processes described herein, variations of the process 1000 are considered as being within the scope of the present disclosure. For example, the process 1000 is described in connection with parameters for a meeting that potentially conflicts with an appointment. The process 1000 (and other processes described herein in connection with meetings) may, however, be modified to operate in connection with an appointment that potentially conflicts with another appointment. Such may be useful, for example, in circumstances where an assistant uses his/her account to schedule appointments for another account.

Figure 11:
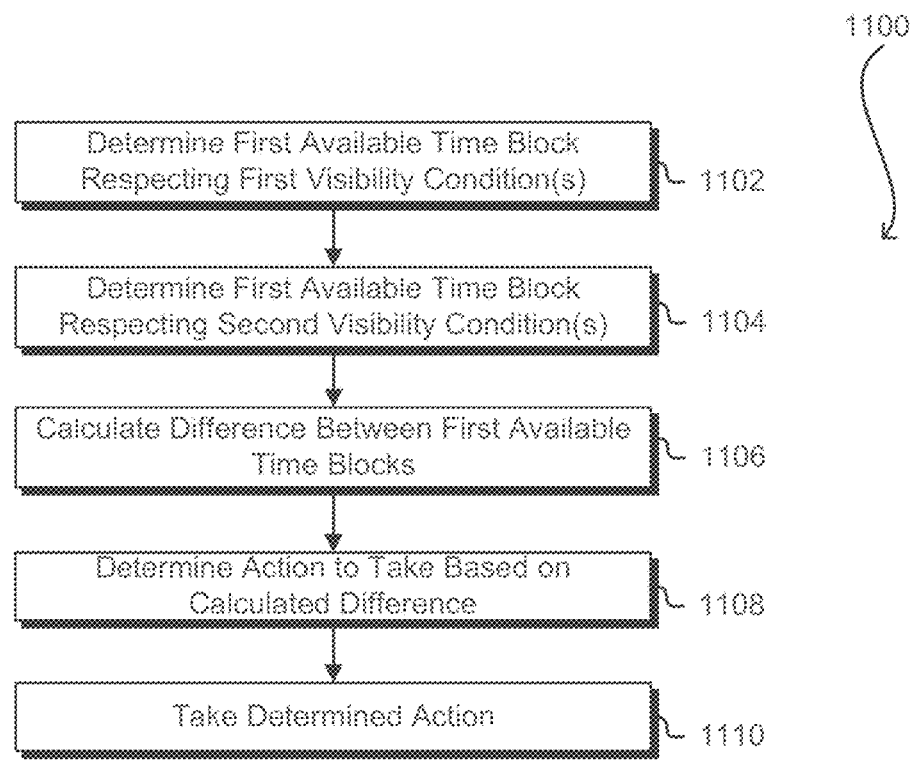
FIG. 11 shows an illustrative example of steps for a process for taking action based on difficulty in scheduling an appointment, in accordance with at least one embodiment.

Various embodiments of the present disclosure also enable calendar functions to be performed in accordance with the difficulty of scheduling a meeting. For example, whether a block of time is indicated as occupied or unoccupied and whether an appointment is treated as moveable, in various embodiments, depend on the difficulty of scheduling a meeting. FIG. 11, accordingly, shows an illustrative example of a process 1100 which may be used to determine whether or not to show a block of time as free or busy, whether or not to propose a block of time as a potential meeting time and/or to perform other operations in connection wish the various embodiments described herein. The process 1100 may be performed by any suitable device, such as a calendar server implementing a calendar management system.

In an embodiment, the process 1100 includes determining 1102 a first available time block respecting one or more first visibility conditions. The first visibility conditions may be any set of visibility conditions, such as described above. In some embodiments, the first visibility conditions are simple in that time blocks for scheduled appointments are always indicated as occupied. In other words, the first set of visibility conditions may be the empty set f in the mathematical sense) and, as a result, there may be no conditions in the first set of visibility conditions. The process 1100 may also include determining 1104 a first available time block, respecting second visibility conditions, where the second visibility conditions may be different from the first visibility conditions. Determining the first available time block (whether for the first or second set of visibility conditions) may be based at least in part on one or more parameters for an appointment, such as a length of the appointment and/or location of the appointment. Constraints, such as the days and times in which valid available appointments may be found, may also be used as parameters.

A difference of time between the first available time blocks may then be calculated 1106. Calculating the difference of time between the first available time blocks may be performed, for example, by calculating the difference between start times, end times, and/or in other ways. An action to take based at least in part on a calculation may then be determined 1108. The calculated action may be. for example, to change the status of a time block such as from occupied to unoccupied, to move an originally conflicting appointment, and/or to deny a request for a meeting time conflicting with a time block and/or other actions. The determined action may then be taken 1110 in accordance with an embodiment.

Figure 12:
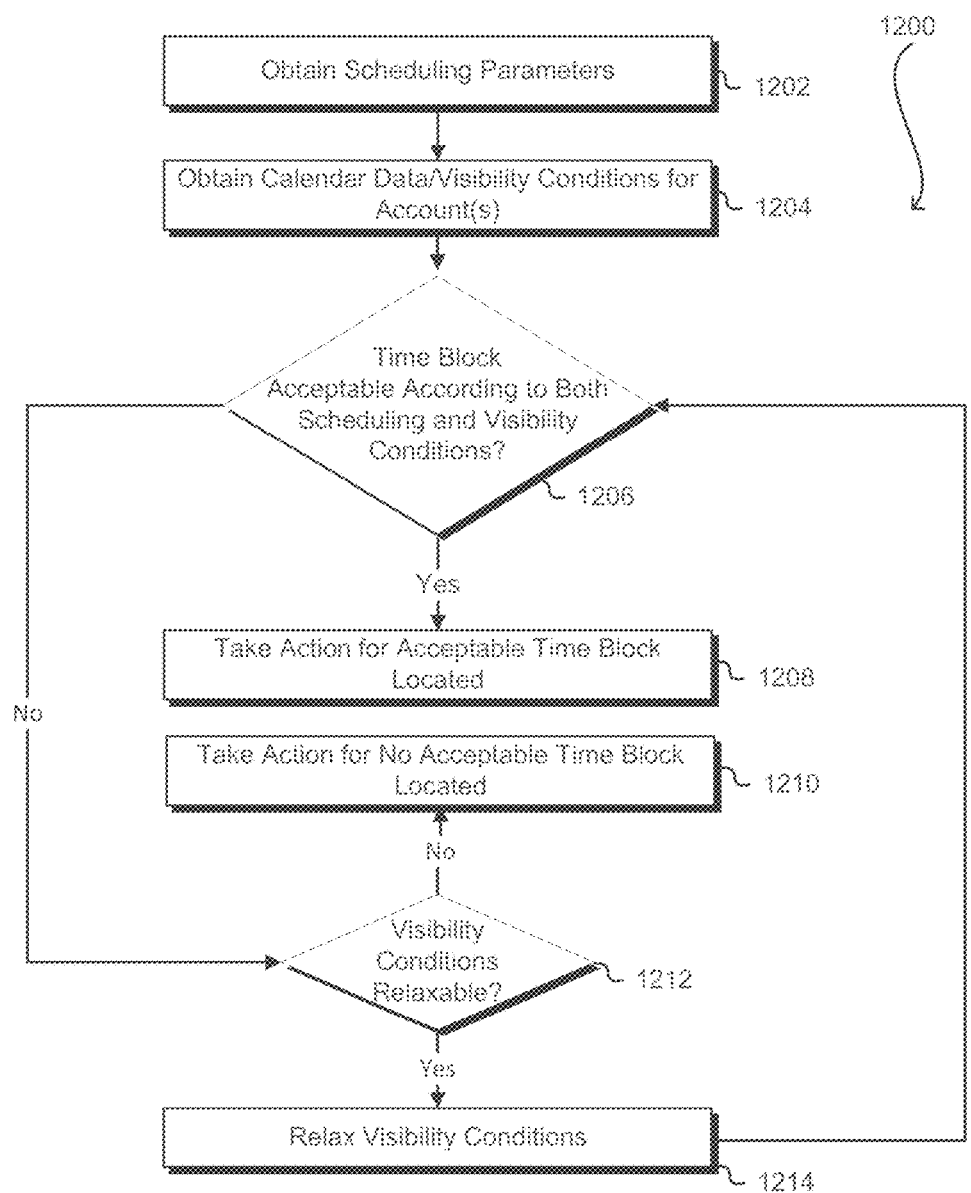
FIG. 12 shows an illustrative example of steps for a process for relaxing visibility conditions to locate an acceptable time block, in accordance with at least one embodiment.

Various embodiments of the present disclosure also provide users with various flexibility in meeting scheduling. FIG. 12, for example, shows an illustrative example of a process 1200 that enables one or more conditions to be relaxed until a suitable time block is located. As with other processes described herein, the process 1200 may be performed by any suitable device, such as a calendar server implementing a calendar management system, in an embodiment, the process 1200 includes obtaining 1202 scheduling parameters. The scheduling parameters may be defined, at least in part, by parameters for a meeting proposal, by accessing parameters from storage, or in any suitable manner. Further, some parameters may be specific to a meeting proposal and others may be more general, such as default parameters. The scheduling parameters may be obtained In any suitable manner, such as receipt over a network and/or accessing the parameters from data storage. The scheduling parameters may have values for various aspects of an appointment (e.g., meeting) to be scheduled, such as an appointment length, one or more attendees, a location, a block of time (e.g., a week or month) in which the meeting should be scheduled, and/or other parameters.

In an embodiment, the process 1200 includes obtaining calendaring data for one or more accounts such as one or more accounts specified by the scheduling parameters. In addition, any visibility conditions included with the obtained calendar data may be included with the obtained calendar data. A determination may then be made 1206 whether there exists a time block that is acceptable according to both the scheduling parameters and visibility conditions, in various embodiments, a time block is acceptable for both the scheduling parameters and visibility conditions if the time block is both within the parameters and indicated as unoccupied (and/or moveable, in some embodiments) according to the visibility conditions. If such a time block does exist, in an embodiment, the process 1200 includes taking a specified action for an acceptable time block having been located. The specified action may be a specified action, such as described above. Briefly, such actions may include providing information about the specified time block for display, scheduling a meeting in the located time block, adding information about the located time block to a set of acceptable time blocks, and/or other actions.

In an embodiment, however, if it is determined 1206 that there is not a time block acceptable for both the scheduling and visibility conditions, a determination may then be made 1210 whether visibility conditions are relaxable. Relaxability may be a user-configurable setting for each appointment with associated visibility conditions. Relaxability may also be a global setting (for an account and/or a system) applicable to all appointments with associated visibility conditions, which may be a default setting. Relaxability may also be specific to one or more particular configurable parameters for appointments (whether appointment-specific or global). For example, relaxability may be specified for meeting importance, job level, and/or other parameters whose possible values vary according to some scale. Further, different types of relaxability may apply. E.g., for a particular appointment, multiple types of relaxability may be associated with the appointment, either in a manner specific to the appointment or associated with multiple appointments.

If it is determined that the visibility conditions are not relaxable, then an action for a lack of acceptable appointment having been located may then be taken 1212. Examples include actions, such as those described above, including, but not limited to, scheduling a meeting in the located time block, providing for display information indicating the acceptable appointment, adding the located appointment to a set of acceptable appointments located, and/or the like.

If it is determined that visibility conditions are relaxable, then the visibility conditions can be relaxed 1214. Relaxing the visibility conditions may be performed in any suitable manner. For example, one or more parameters defining visibility conditions may be incremented in a manner resulting in less restrictive conditions (e.g., by changing the value of an appointment's importance from "highly important" to "important" or "not important" or by changing the value of a job level to be less restrictive). As another example, one or more parameters defining visibility conditions may be disregarded.

Once the visibility conditions are relaxed 1214, a determination may then be made on whether the time block may be made 1206, and whether a time block satisfying both scheduling and visibility conditions exists. The process 1200 may then continue as described above until it is determined 1206 that a time block satisfying both scheduling and visibility conditions exists or it is determined 1210 that the visibility conditions are no longer relaxable. Visibility conditions may be no longer relaxable if, for example, there are no parameters that define visibility conditions that may be changed further and/or if one or more limits (which may be user configurable) for changing parameters have been reached.

Numerous variations of the above techniques are considered as being within the scope of the present disclosure. For example, visibility conditions may be based on a wide variety of information available to a calendar management system. For example, as noted, the difficulty in scheduling a meeting with certain parameters may be used to determine whether to indicate a block of time as occupied or unoccupied. Examples for calculating difficulty are given above, although other techniques may also be used. For instance, difficulty can be based on the density of appointments in one or more calendars for one or more invitees of a meeting proposal. Density may be calculated based at least in part on the amount of occupied time relative to the amount of unoccupied time in a particular time range (e.g., a week or a month).

As another example, various techniques described above take into account the identity of an organizer of a meeting. The organizer of a meeting, however, may be organizing the meeting on behalf of another user. Accordingly, in such instances, various embodiments of the present disclosure may take into account the identity of the account on behalf of a user of another account that is organizing a meeting as well as, or as an alternative to, the identity of the organizer of the meeting. As discussed, in some embodiments, the identities of multiple invitees specified by a meeting proposal may be taken into account. Advanced functionality may be used in connection with multiple identities associated with a meeting. For example, the sparsity of specified identities in an organizational tree may be used as a parameter in one or more visibility conditions.

Various techniques described herein, while nevertheless useful due to the technical advantages they provide, may be subject to abuse if simplistically employed. For example, an organizer of a meeting may list an important person in a meeting proposal before submitting the invitation for distribution to others, the sole purpose of which is to cause appointments of others with visibility conditions associated with the appointments to be shown as unoccupied. The organizer may then remove the important person's identity from the meeting proposal before transmitting to the remaining invitees (so as to not provide an annoying and unnecessary message to the important person). Various techniques rnay be used to prevent such abuse. For example, if an identity is removed from a meeting proposal and the previous inclusion of that individual caused additional time blocks to appear as unoccupied, a calendar management system may prevent transmission of the meeting proposal to others. While, absent more complex tracking, this may be circumvented by creating a new meeting proposal with the same attendees (minus the important person), the extra time and effort needed to generate a new meeting proposal may deter some users from doing this. In addition, in some embodiments, abusive techniques employed to circumvent visibility conditions may, when detected, have a tasteful impact. For instance, using the above example of the engineer and the administrator, if the administer employs a trick to view additional time blocks of the engineer's calendar and, as a result, proposes a meeting for a block of time that the administrator would have, absent the trick, otherwise seen as occupied, the engineer may be able to cause a stateful impact to occur. For instance, the engineer may be provided the ability to, through a user interface, decline the meeting proposal with an indication that the meeting should not have been proposed. As a result, a calendar management system may update one or more records to, for example, strengthen visibility conditions of the engineer relative to the administrator and/or prevent the administrator from proposing such meetings in the future. As another example, meeting proposals may be analyzed upon submission (by a calendar server and/or a client of the calendar server, e.g.). If, according to visibility conditions associated with an appointment, the parameters for a submitted meeting proposal conflicts with the appointment, a user interface may indicate that the meeting should not have been proposed due to the conflict. The user interface may, for example, be a calendar that visually distinguishes such meeting proposals, such as by representing the meeting proposals by a particular color and/or by a textual message indicating the conflict.

In addition, various techniques described above provide illustrative examples of factors that may be used in analysis of how to provide calendar data, e.g., analysis of whether to indicate a block of time as unoccupied or occupied. The explicitly noted examples are not an exhaustive list and other factors may be used in addition to or instead of those explicitly discussed. Some example factors include the number of invitees to a meeting and/or any conditions on meeting attendance (e.g. that a quorum is needed for the meeting to occur, where a quorum may be defined by conditions such as a certain number of people from each of a plurality of specified departments). As another example, keywords in a meeting subject may also be used. For example, using the example of the engineer and the administrator, the engineer may set visibility conditions such that, for any meeting proposal having "invention disclosure" in the subject or another field, a time block from 9:00 a.m. to 11:00 a.m. appears as occupied. More complex semantic analysis of the subject and/or other fields may also be used to determine an importance for a proposed meeting.

Some embodiments of the present disclosure may take into account locations specified for meeting proposals. For example, if a meeting proposal organized by one account specifies a location, calendar data for other accounts may be modified such that, if an existing appointment for another account specifies a different location, the existing appointment is provided to the account as a larger time block than its actual size. This may provide a buffer to allow travel from one location to the other. The size of the buffer (e.g., the amount by which the time block is increased) may depend on the distance between the locations. In addition, some values for a location field (e.g., "conference call") may result in little or no buffer because attendees rnay call into a meeting without necessarily travelling. Further, some embodiments of the present disclosure allow users to specify multiple locations for a meeting proposal. Visibility conditions may be based at least in part on whether any (i.e. at least one) of the multiple locations are suitable.

Figure 13:
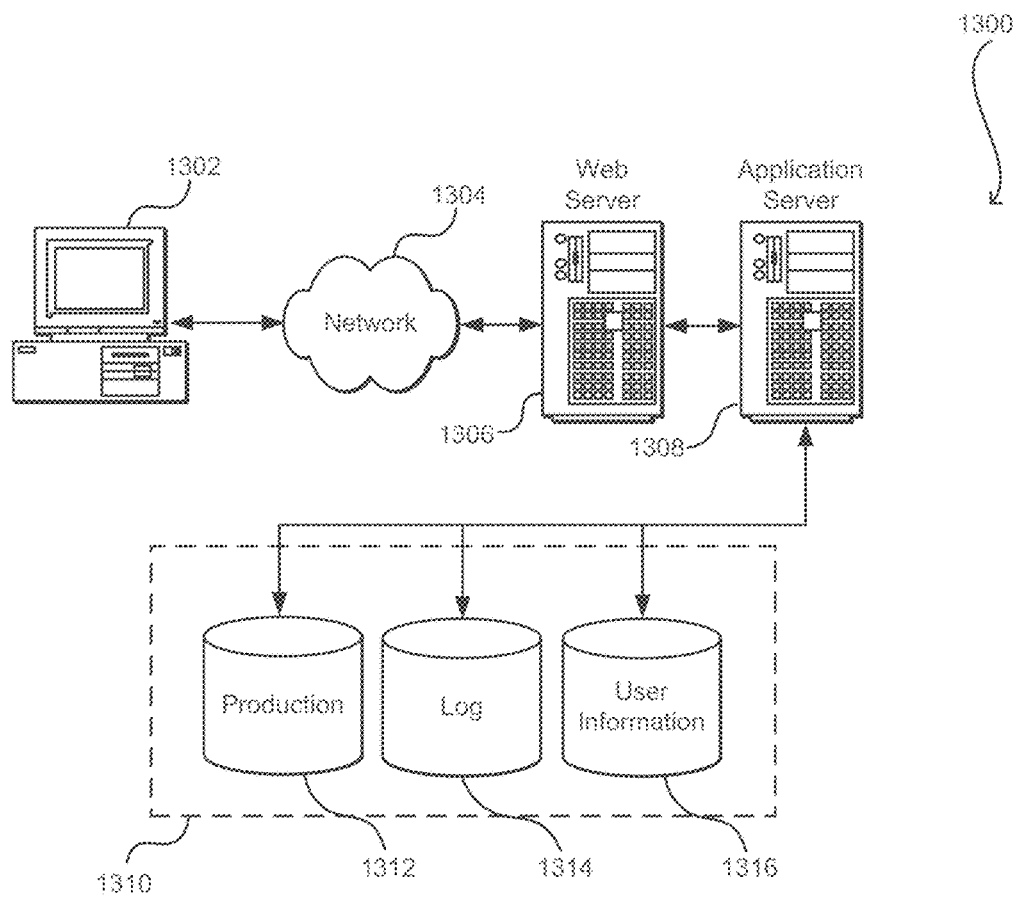
FIG. 13 illustrates an environment in which various embodiments can be implemented

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages or information over an appropriate network 1304 and convoy information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks, an alternative device serving a similar purpose could be used as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis or other such purposes. It should be understood that there can be many other aspects that may need to be stored in the data store, such as page image information and access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read-only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent, as if each reference were individually and specifically indicated to be incorporated by reference and were set forth in its entirety herein.

What is claimed is:

1. A computer-implemented method for providing access to calendar information, the method comprising:
receiving, by a computer system, parameters for a calendar appointment that include one or more identity conditions specific to the calendar appointment;
modifying, by the computer system, access control information in accordance with the one or more conditions;
receiving, from a requestor device, a request for access to calendar information for a block of time that at least partially intersects a block of time for the calendar appointment;
in response to the request:
determining, by the computer system, information that identifies that the block of time for the calendar appointment is occupied instead of identifying that the block of time for the calendar appointment is unoccupied based at least in part on an identity associated with a requestor of the requestor device and the modified access control information; and providing, to the requestor device, a response causing a graphical update to a user interface displayed on the requestor device, the user interface configured to present the calendar information, the response identifying the block of time for the calendar appointment as occupied based at least in part on the determined information and the modified access control information thereby enabling the requestor associated with the requestor device to more efficiently identify another block of time for another calendar appointment.

2. The computer-implemented method of claim 1, wherein the response identifies one or more other calendar appointments as occupied according to the modified access control information.

3. The computer-implemented method of claim 1, wherein:
the request encodes one or more invitees of an electronic meeting request; and
determining the information is further based at least in part on identities of the one or more invitees.

4. The computer-implemented method of claim 1, wherein the one or more identity conditions include at least one condition applicable to multiple identities associated with an attribute specified by the at least one condition.

5. The computer-implemented method of claim 4, wherein:
the one or more identity conditions specify a rank in a ranking of identities; and
the determination is dependent on a rank of the identity associated with the requestor fulfilling a condition based at least in part on the rank of the identity and the specified rank.

6. The computer-implemented method of claim 1, wherein the identity associated with the requestor is an identity of the requestor.

7. One or more non-transitory computer-readable storage media having collectively stored thereon instructions executable by one or more processors of a computer system to cause the computer system to at least:
provide a user interface that enables a user to at least:
specify a block of time; and
specify one or more conditions for the block of time that, when processed by a calendar management system, cause the calendar management system to cause different users to access different information that indicates whether the specified block of time is occupied, in accordance with the specified one or more conditions, wherein accessing the different information by the different users includes causing a graphical update to one or more user interfaces that correspond to calendar management system accounts associated with the different users, the graphical update providing a graphical representation, via the user interfaces, of whether the specified block of time is occupied thereby enabling the different users to more efficiently identify another block of time for a calendar appointment.

8. The one or more non-transitory computer-readable storage media of claim 7, wherein:
specifying the one or more conditions for the block of time includes specifying one or more account identifiers of the calendar management system accounts to which the specified one or more conditions are applicable.

9. The one or more non-transitory computer-readable storage media of claim 7, wherein:
specifying the one or more conditions for the block of time includes specifying one or more attributes that enable the calendar management system to determine, based at least in part on the attributes, a set of one or more calendar management system accounts to which the specified one or more conditions are applicable.

10. The one or more non-transitory computer-readable storage media of claim 7, wherein:
at least some of the attributes are ranked;
specifying the one or more condition includes specifying at least one condition on a rank of a specified attribute.

11. The one or more non-transitory computer-readable storage media of claim 7, wherein:
the instructions are from a productivity application that manages at least electronic mail and an electronic calendar for an account of a productivity system that includes the calendar management system;
the productivity application is from a suite of productivity applications configured to interact with one another.

12. The one or more non-transitory computer-readable storage media of claim 7, wherein:
the user interface is a user interface for inserting blocks of time into an electronic calendar.

* * * * *